US012713223B2

(12) United States Patent
Hampali

(10) Patent No.: US 12,713,223 B2
(45) Date of Patent: Aug. 18, 2026

(54) METHOD AND SYSTEM FOR MANAGING INCOMING CALL IN EMBEDDED SUBSCRIBER IDENTITY MODULE DEVICE

(71) Applicant: SAMSUNG ELECTRONICS CO., LTD., Suwon-si (KR)

(72) Inventor: Mallikarjuna Hampali, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 438 days.

(21) Appl. No.: 18/143,787

(22) Filed: May 5, 2023

(65) Prior Publication Data

US 2024/0056791 A1 Feb. 15, 2024

Related U.S. Application Data

(63) Continuation of application No. PCT/KR2023/004745, filed on Apr. 7, 2023.

(30) Foreign Application Priority Data

Aug. 12, 2022 (IN) ............................ 202241046197

(51) Int. Cl.
*H04W 8/18* (2009.01)
*H04W 88/06* (2009.01)

(52) U.S. Cl.
CPC ............ *H04W 8/183* (2013.01); *H04W 88/06* (2013.01)

(58) Field of Classification Search
None
See application file for complete search history.

(56) References Cited

U.S. PATENT DOCUMENTS 9,332,129 B2 5/2016 Li et al.
9,883,041 B2 1/2018 Kim et al.
10,715,978 B2 7/2020 Alamartimo et al.
(Continued)

FOREIGN PATENT DOCUMENTS

CN 111148088 A 5/2020
EP 3 982 607 A1 4/2022
(Continued)

OTHER PUBLICATIONS

International Search Report (PCT/ISA/210) issued Jul. 19, 2023 by the International Searching Authority in International Patent Application No. PCT/KR2023/004745.
(Continued)

*Primary Examiner* — Idowu O Osifade
(74) *Attorney, Agent, or Firm* — Sughrue Mion, PLLC

(57) ABSTRACT

A server, for managing an incoming call in an embedded Subscriber Identity Module (eSIM) network, is configured to receive a first MSISDN number of a first eSIM profile among a plurality of eSIM profiles in an electronic device from a Mobile Network Operator (MNO) to obtain an operating status associated with a first eSIM profile. The server is also configured to determine that the operating status associated with the first eSIM profile is inactive in response to receiving the first Mobile Station Integrated Services Digital Networks (MSISDN) number. The server is further configured to transmit a second MSISDN number associated with a second eSIM profile among the plurality of eSIM profiles whose operating status is active to the MNO in response to determining at the operating status associated with the eSIM profile is inactive.

18 Claims, 25 Drawing Sheets

(56) References Cited

U.S. PATENT DOCUMENTS

| | | | | |
|---|---|---|---|---|
| 10,771,955 | B2 | 9/2020 | Park et al. | |
| 11,129,014 | B2 | 9/2021 | Li et al. | |
| 11,129,026 | B1 * | 9/2021 | Chauhan | H04W 4/50 |
| 2012/0275442 | A1 | 11/2012 | Malets et al. | |
| 2020/0367043 | A1 * | 11/2020 | Anand | H04W 12/40 |
| 2021/0227381 | A1 | 7/2021 | Anand | |
| 2021/0250430 | A1 | 8/2021 | Moon | |
| 2021/0289360 | A1 * | 9/2021 | Park | H04W 12/35 |
| 2022/0141642 | A1 | 5/2022 | Boyapalle et al. | |
| 2024/0251230 | A1 * | 7/2024 | Gupta | H04W 12/72 |

FOREIGN PATENT DOCUMENTS

| | | | |
|---|---|---|---|
| KR | 2021-0101667 | A | 8/2021 |
| KR | 10-2331692 | B1 | 11/2021 |
| KR | 10-2333138 | B1 | 11/2021 |
| WO | 2020/153801 | A1 | 7/2020 |
| WO | 2021/087497 | A1 | 5/2021 |

OTHER PUBLICATIONS

Written Opinion (PCT/ISA/237) issued Jul. 19, 2023 by the International Searching Authority in International Patent Application No. PCT/KR2023/004745.

Extended European Search Report issued Oct. 7, 2025, in corresponding European Patent Application No. 23852669.3.

Communication issued Feb. 9, 2026, by the Intellectual Property India in corresponding Indian Application No. 202241046197.

* cited by examiner receiving the incoming call from the first electronic device — 302 transmitting by the MNO, the first MSIISDN to a Service Control Function (SCF) upon receiving the incoming call directed towards the first MSISDN NUMBER — 304 receiving the first MSISDN NUMBER by the server 104 transmitted by the MNO via the SCF — 306 determining by the server that the operating status associated with the first eSIM profile is inactive — 308 transmitting a response to the MNO — 310 receiving the response from the server including the second MSISDN number associated with the second eSIM profile whose operating status is active — 312 routing the incoming call on the second MSISDN NUMBER of the second eSIM profile whose operating status is active — 314

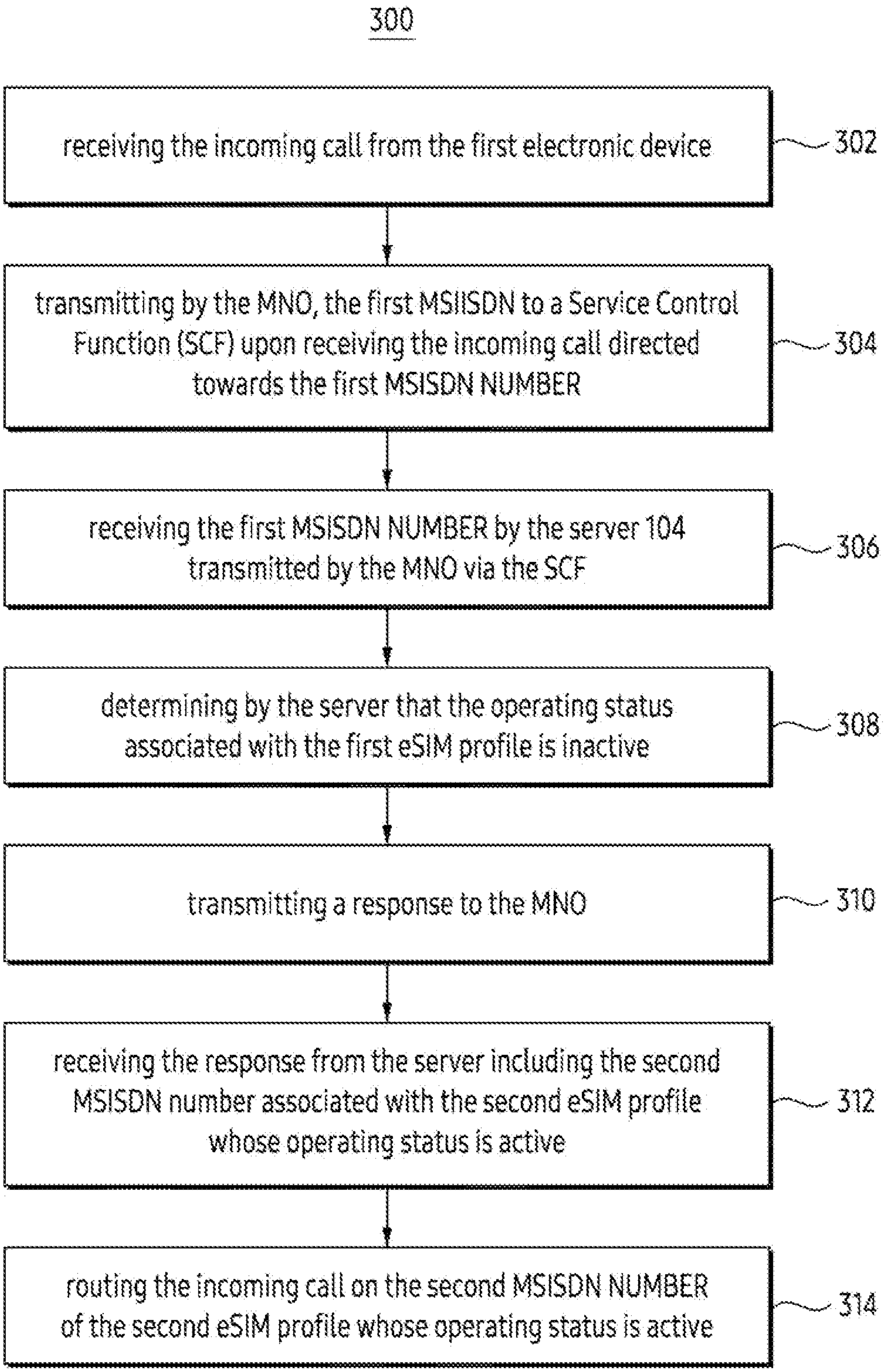

RECEIVING A FIRST MSISDN NUMBER OF A FIRST ESIM PROFILE AMONGST A PLURALITY OF ESIM PROFILES IN AN ELECTRONIC DEVICE FROM A MNO TO OBTAIN AN OPERATING STATUS ASSOCIATED WITH A FIRST ESIM PROFILE, WHEREIN THE MNO TRANSMITS THE FIRST MSISDN NUMBER UPON RECEIVING THE INCOMING CALL FROM A FIRST ELECTRONIC DEVICE DIRECTED TOWARDS THE SECOND ELECTRONIC DEVICE ON THE FIRST MSISDN NUMBER — 702

DETERMINING THAT THE OPERATING STATUS ASSOCIATED WITH THE FIRST ESIM PROFILE IS INACTIVE IN RESPONSE TO RECEIVING THE FIRST MSISDN NUMBER, WHEREIN THE SERVER COMPRISES THE PLURALITY OF ESIM PROFILES WITH THE OPERATING STATUS ASSOCIATED WITH EACH OF THE PLURALITY OF ESIM PROFILES — 704

TRANSMITTING A SECOND MSISDN NUMBER ASSOCIATED WITH A SECOND ESIM PROFILE AMONGST THE PLURALITY OF ESIM PROFILES WHOSE OPERATING STATUS IS ACTIVE TO THE MNO IN RESPONSE TO DETERMINING AT THE OPERATING STATUS ASSOCIATED WITH THE ESIM PROFILE IS INACTIVE — 706

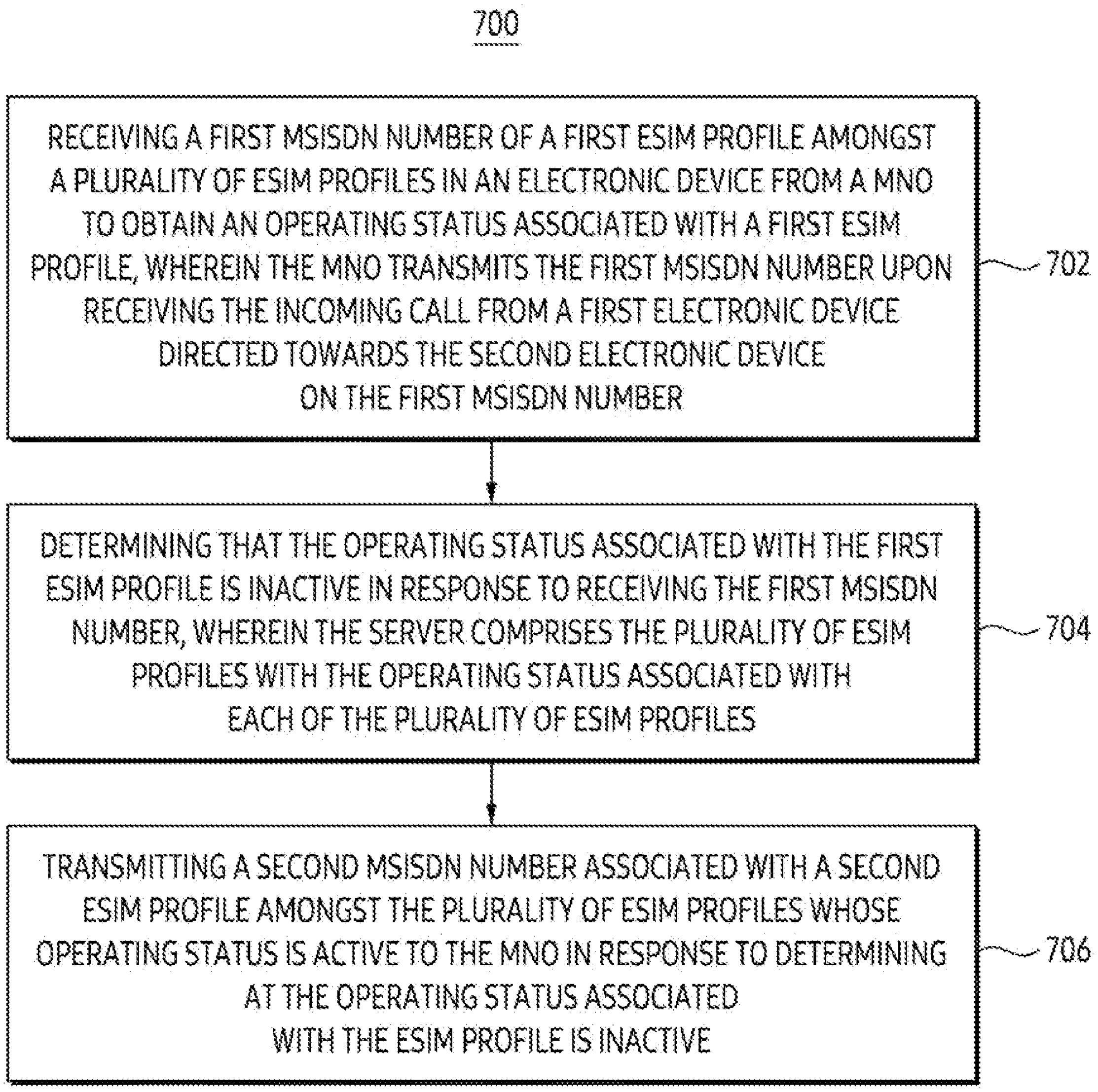

FIG. 7

METHOD AND SYSTEM FOR MANAGING INCOMING CALL IN EMBEDDED SUBSCRIBER IDENTITY MODULE DEVICE

CROSS-REFERENCE TO RELATED APPLICATIONS

This application is a by-pass continuation application of International Application No. PCT/KR2023/004745, filed on Apr. 7, 2023, which based on and claims priority to India Patent Application No. 202241046197, filed on Aug. 12, 2022, in the Korean Intellectual Property Office, the disclosures of which are incorporated by reference herein in their entireties.

BACKGROUND

1. Field

The present disclosure generally relates to field of wireless communication, and more particularly to a method and system for managing an incoming call in an embedded Subscriber Identity Module (eSIM) device with a number of eSIM profiles.

2. Description of Relate Art

Traditionally, eSIM enables device user to acquire any number of eSIM profiles across carriers, known to his/her contacts by any of the corresponding Mobile Station Integrated Services Digital Networks (MSISDN) number and activate one eSIM Profile at a time within an embedded Universal Integrated Circuit Card (eUICC) manually or automatically based on coverage, cost or geographical area. This may lead to below problems.

The above information is presented as background information only to assist with an understanding of the disclosure. No determination has been made, and no assertion is made, as to whether any of the above might be applicable as prior art with regard to the disclosure.

SUMMARY

From a network perspective, when originating network try to set up call to an eUICC user with N profiles (MSISDN numbers), N−1 call attempts result in a call fail as one Profile only will be active within the eUICC and hence, valuable network resources (radio bearers at originating leg and trunk circuit between core networks) are wasted.

From a user's perspective, when user's contact try to call an eSIM user on a MSISDN number for which the profile is not active, there is no mechanism for directly connecting the call on any of the active eSIM Profile (and hence, the active MSISDN number) within the user's eUICC.

Here, 'Mobile Station Integrated Services Digital Network' is introduced as one interpretation (full name) for MSISDN. In the relevant art, 'MSISDN' also refers to other interpretations, such as 'Mobile Station International Subscriber Directory Number' and 'Mobile Subscriber ISDN Number.'

The eSIM is the emerging domain to provide mechanism to secure multiple subscription profiles and enable appropriate profile based on subscription charges and quality of connection. Current generation smartphones are equipped with eUICC hardware element which can store many eSIM profiles and any point in time one eSIM Profile can be active within eUICC element.

When a telephone call is made to eSIM user with multiple eSIM profiles and multiple corresponding MSISDN numbers, call will be successfully connected only when the eSIM profile corresponding to the called MSISDN number is active or a feature of call forwarding to an active number is manually or automatically set. If the feature of call forwarding is not set, the call will fail. Or, if the feature of call forwarding is set, the user has to bear additional cost of the call forwarding for receiving the call on the active number.

This summary is provided to introduce a selection of concepts, in a simplified format, that are further described in the detailed description of the disclosure. This summary is neither intended to identify key or essential elements of the disclosure and nor is it intended for determining the scope of the disclosure.

According to an aspect of the present disclosure, a method, performed by a Mobile Network Operator (MNO) for managing an incoming call in an embedded Subscriber Identity Module (eSIM) device with a plurality of eSIM profiles, includes: receiving the incoming call from a first electronic device directed to a second electronic device on a first Mobile Station Integrated Services Digital Networks (MSISDN) number of a first eSIM profile among the plurality of eSIM profiles in the second electronic device; transmitting the first MSISDN number to a server to obtain an operating status associated with the first eSIM profile; receiving a response from the server, the response including a second MSISDN number associated with a second eSIM profile whose operating status is active from the plurality of eSIM profiles based on inactive operating status associated with the first eSIM profile; and routing the incoming call on the second MSISDN number of the second eSIM profile whose operating status is active in response to receiving the response.

According to another aspect of the present disclosure, a method performed by a server for managing an incoming call in an eSIM network, the method includes: receiving a first MSISDN number of a first eSIM profile among a plurality of eSIM profiles in an electronic device from a MNO to obtain an operating status associated with a first eSIM profile, determining that the operating status associated with the first eSIM profile is inactive in response to receiving the first MSISDN number. The server is configured to include the plurality of eSIM profiles and provide the operating status associated with each of the plurality of eSIM profiles. The method further includes transmitting a second MSISDN number associated with a second eSIM profile among the plurality of eSIM profiles whose operating status is active to the MNO in response to determining at the operating status associated with the eSIM profile is inactive.

According to another aspect of the present disclosure, a MNO, for managing an incoming call in an eSIM device with a plurality of eSIM profiles, includes a processor configured to cause the MNO to: receive the incoming call from a first electronic device directed to a second electronic device on a first MSISDN number of a first eSIM profile among the plurality of eSIM profiles in the second electronic device; transmit the first MSISDN number to a server to obtain an operating status associated with the first eSIM profile; receive a response from the server including a second MSISDN number associated with a second eSIM profile whose operating status is active from the plurality of eSIM profiles based on inactive operating status associated with the first eSIM profile; and route the incoming call on the second MSISDN number of the second eSIM profile whose operating status is active in response to receiving the response.

According to another aspect of the present disclosure, a server, for managing an incoming call in an eSIM network, comprises a processor configured to cause the server to: receive a first MSISDN number of a first eSIM profile among a plurality of eSIM profiles in an electronic device from a MNO to obtain an operating status associated with a first eSIM profile. The MNO is configured to transmit the first MSISDN number upon receiving the incoming call from a first electronic device directed towards the second electronic device on the first MSISDN number. The processor is further configured to cause the server to determine that the operating status associated with the first eSIM profile is inactive in response to receiving the first MSISDN number. The server is configured to include the plurality of eSIM profiles and provide the operating status associated with each of the plurality of eSIM profiles. The processor is further configured to cause the server to transmit a second MSISDN number associated with a second eSIM profile amongst the plurality of eSIM profiles whose operating status is active to the MNO in response to determining at the operating status associated with the eSIM profile is inactive.

According to another aspect of the present disclosure, a server, for providing connectivity to an eSIM in an electronic device, includes a processor configured to cause the server to: receive an eSIM profile from the electronic device, wherein the eSIM profile corresponds to a MSISDN number; associate the eSIM profile with the MSISDN number by using an eUICC key associated with the eSIM profile; and register the MSISDN number at the server through an OTP authentication mechanism.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates an operational flow diagram depicting a process for managing an incoming call in an eSIM device with a number of eSIM profiles, in accordance with an embodiment of the present disclosure;

FIG. 7 illustrates a flow diagram depicting a method implemented at a server for managing an incoming call in an eSIM network, in accordance with an embodiment of the present disclosure;

Figure 1:
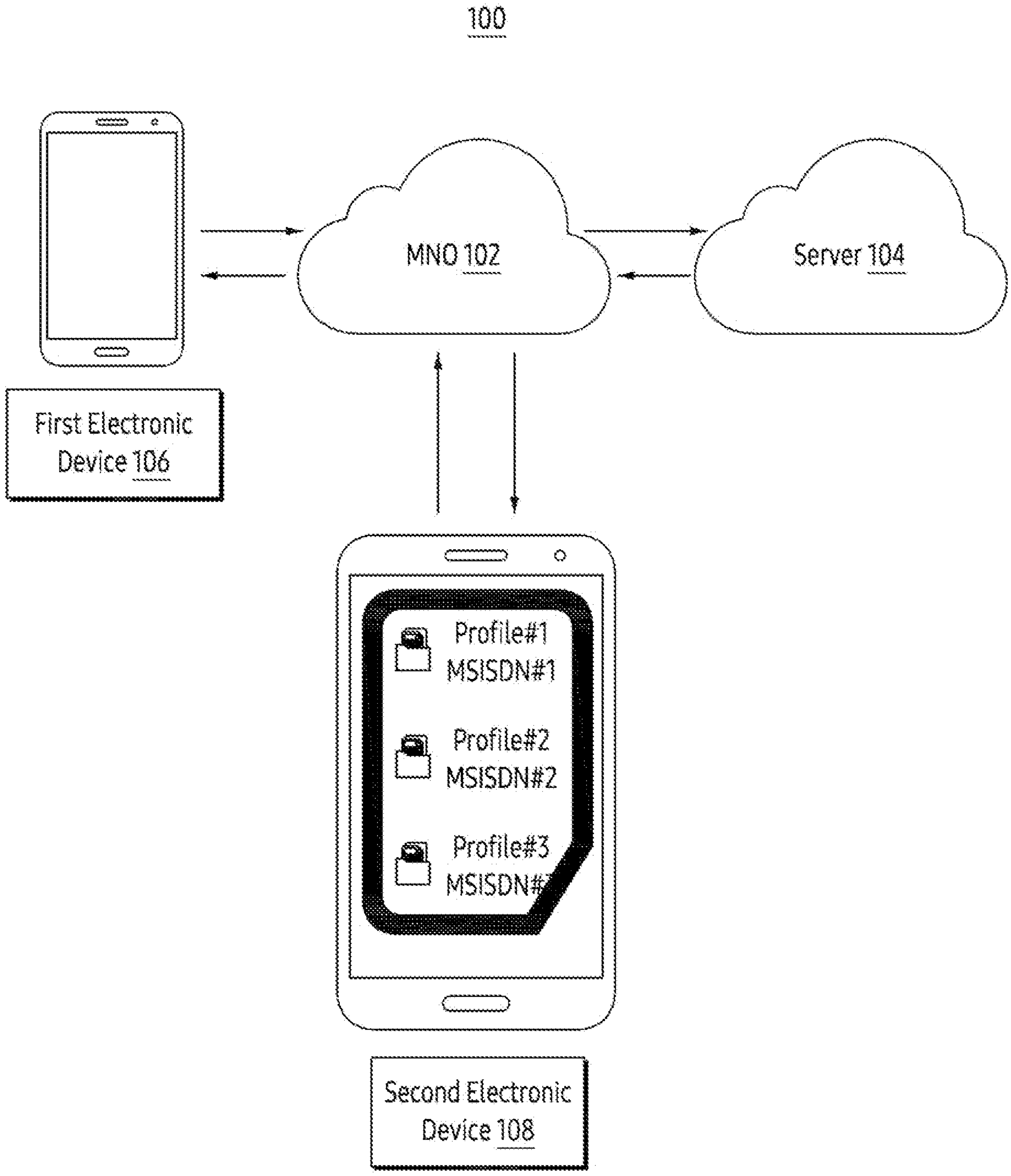
FIG. 1 illustrates an environment for managing an incoming call in an embedded Subscriber Identity Module (eSIM) device with a plurality of eSIM profiles, in accordance with an embodiment of the present disclosure.

Further, skilled artisans will appreciate that elements in the drawings are illustrated for simplicity and may not have necessarily been drawn to scale. For example, the flow charts illustrate the method in terms of the most prominent operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims do not be limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since various embodiments of the disclosure may include a technology that utilizes both the hardware-based and the software-based approaches, they are not intended to exclude the software-based approach.

As used herein, the terms referring to merging (e.g., merging, grouping, combination, aggregation, joint, integration, unifying), the terms referring to signals (e.g., packet, message, signal, information, signaling), the terms referring to resources (e.g. section, symbol, slot, subframe, radio frame, subcarrier, resource element (RE), resource block (RB), bandwidth part (BWP), opportunity), the terms used to refer to any operation state (e.g., step, operation, procedure), the terms referring to data (e.g. packet, message, user stream, information, bit, symbol, codeword), the terms referring to a channel, the terms referring to a network entity (e.g., distributed unit (DU), radio unit (RU), central unit (CU), control plane (CU-CP), user plane (CU-UP), O-DU-open radio access network (O-RAN) DU), O-RU (O-RAN RU), O-CU (O-RAN CU), O-CU-UP (O-RAN CU-CP), O-CU-CP (O-RAN CU-CP)), the terms referring to the components of an apparatus or device, or the like are only illustrated for convenience of description in the disclosure. Therefore, the disclosure is not limited to those terms described below, and other terms having the same or equivalent technical meaning may be used therefor. Further, as used herein, the terms, such as '~module', '~unit', '~part', '~body', or the like may refer to at least one shape of structure or a unit for processing a certain function.

Further, throughout the disclosure, an expression, such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression, such as 'above', a condition described as 'less than or equal to' may be replaced with an expression, such as 'below', and a condition described as 'more than or equal to and below' may be replaced with 'above and less than or equal to', respectively. Furthermore, hereinafter, 'A' to 'B' means at least one of the elements from A (including A) to B (including B). Hereinafter, 'C' and/or 'D' means including at least one of 'C' or 'D', that is, {'C', 'D', or 'C' and 'D'}.

The disclosure describes various embodiments using terms used in some communication standards (e.g., 3rd Generation Partnership Project (3GPP), extensible radio access network (xRAN), open-radio access network (O-RAN) or the like), but it is only of an example for explanation, and the various embodiments of the disclosure may be easily modified even in other communication systems and applied thereto.

For promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

FIG. 1 illustrates an environment 100 for managing an incoming call in an embedded Subscriber Identity Module (eSIM) device with a plurality of eSIM profiles, in accordance with an embodiment of the present disclosure. The environment 100 may include a Mobile Network Operator (MNO) 102, a server 104, a first electronic device 106, and a second electronic device 108. The second electronic device 108 may be the eSIM device with the number of eSIM profiles. Each eSIM profile may be related to an eSIM. Examples of the first electronic device 106, and the second electronic device 108 may include, but are not limited to, a smartphone, and a mobile phone having a number of eSIMs.

In one embodiment, the MNO 102 may receive an incoming call from the first electronic device 106. The incoming call may be directed towards second electronic device 108. Further, one the second electronic device 108, the incoming call may be directed on a first MSISDN number of a first eSIM profile among the number of eSIM profiles in the second electronic device 108.

Subsequent to receiving the incoming call, the MNO 102 may transmit the first MSISDN number to the server 104 to obtain an operating status related to the first eSIM profile. The operating status may indicate whether the first eSIM is active or inactive when the incoming call is received for the same. The server 104 may receive the first MSISDN number of the first eSIM profile.

In response to receiving the first MSISDN number, the server 104 may determine that the operating status associated with the first eSIM profile is inactive. The server 104 may include the number of eSIM profiles with the operating status associated with each of the number of eSIM profiles. The server 104 may transmit a response including a second MSISDN number associated with a second eSIM profile to the MNO 102. The second eSIM profile may be among the number of eSIM profiles whose operating status is active. Subsequently, the MNO 102 may receive the response including the second MSISDN number with the second eSIM whose operating system is active.

In response to receiving the second MSISDN number, the MNO 102 may route the incoming call on the second MSISDN number of the second eSIM profile whose operating status is active.

Figure 2:
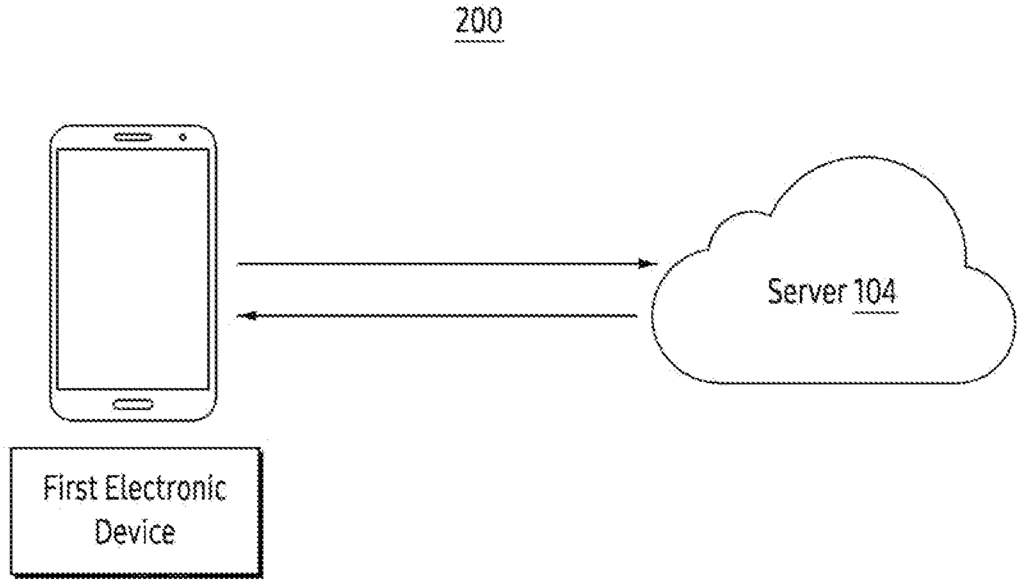
FIG. 2 illustrates an environment for providing connectivity to an eSIM in an electronic device, in accordance with an embodiment of the present disclosure.

FIG. 2 illustrates a system 200 for providing connectivity to an eSIM in an electronic device, in accordance with an embodiment of the present disclosure. The eSIM may include a MSISDN number and the eSIM may be associated with an eSIM profile that may be stored at the server 104.

According to an embodiment of the present disclosure, the server 104 may receive an eSIM profile from the electronic device. The eSIM profile may be of an eSIM and may be associated with a MSISDN number. In an embodiment, the electronic device may include number of eSIM profiles such that the electronic device may be an eSIM device configured to deploy a number of eSIMs in the electronic device. Further, the eSIM profile may be stored by the server 104 in an embedded Universal Integrated Circuit Card (eUICC) element by scanning a MNO subscription card and deriving SM-DP+ address and securely connecting to right SM-DP+ for downloading a MNO Profile.

Subsequent to receiving the eSIM profile, the server 104 may associate the eSIM profile with the MSISDN number. The association may be performed by using an eUICC key associated with the eSIM profile. The eSIM profile may be stored at the server 104 corresponding to a unique eUICC Identification (ID). The server 104 may keep track of an operating status of the eSIM profile. The operating status may be one of an active status, and an inactive status. The eSIM profile may include a MSISDN number and the eSIM associated with the eSIM profile that includes the operating status as the active status, may receive an incoming call on an MSISDN number related to the eSIM at the electronic device. In an embodiment, where it is determined that the eSIM is inactive and the electronic device includes another eSIM with another eSIM profile with an active status stored at the server 104 and another MSISDN number, the server 104 may find the other MSISDN number within the eSIM profiles corresponding to the unique eUICC ID.

In response to associating the eSIM profile, the server 104 may register the MSISDN number at the server 104 through a One-Time Password (OTP) authentication mechanism. The OTP mechanism may be used to confirm whether the MSISDN number is genuine and belongs to a user of the eSIM. The OTP mechanism may be performed each time an eSIM profile is activated by the user for a first time. For all the MSISDN numbers, the server 104 may perform a periodic OTP authentication to confirm that each MSISDN number may include a valid subscription with A MNOs. In an embodiment, where it is determined that a subscription with the MNO is inactive, the server 104 may be configured delete the MSISDN number.

FIG. 3 illustrates an operational flow diagram depicting a process 300 for managing an incoming call in an eSIM device with a number of eSIM profiles, in accordance with an embodiment of the present disclosure. The eSIM device may be the second electronic device 108 as referred in the FIG. 1 with the number of eSIM profiles. The number of eSIM profiles in the second electronic device 108 may indicate that the second electronic device 108 may be enabled with a number of eSIMs such that the second electronic device 108 may receive an incoming call on a number of MSISDN numbers related to the number of eSIM profiles. The incoming call may be managed by the MNO 102 by deciding whether to route the call or not. The MNO 102 may decide whether to route the incoming call or not upon communicating with the server 104 as referred in the FIG. 1. The server 104 may interchangeably be referred as an always connect server.

At operation 302, the process 300 may include receiving the incoming call from the first electronic device 106 as referred in the FIG. 1 at the MNO 102. The incoming call may be directed towards the second electronic device 108. More particularly, the first electronic device 106 may make the incoming call on a first MSISDN number related to a first eSIM profile from the number of profiles in the second electronic device 108.

At operation 304, the process 300 may include transmitting by the MNO 102, the first MSISDN number to a Service Control Function (SCF) upon receiving the incoming call directed towards the first MSISDN number. The SCF may be a network element that contains a service logic. The service logic may implement a behavior desired by the MNO 102. The first MSISDN number may be intended to be transmitted to the server 104 via the SCF in order to verify an operating status of the first eSIM profile to which the first MSISDN number is related. The operating status of the first eSIM may be one of an active status and an inactive status. Further, the process 300 may include transmitting the first MSISDN number by the SCF to the server 104. The SCF may transmit the first MSISDN number in the form a message "Get_active MSISDN number".

At operation 306, the process 300 may include receiving the first MSISDN number by the server 104 transmitted by the MNO 102 via the SCF. The server 104 may communicate with the SCF to receive the first MSISDN number.

At operation 308, the process 300 may include an operation of determining by the server 104 that the operating status associated with the first eSIM profile is inactive. The server 104 may include the number of eSIM profiles with the operating status associated with each of the plurality of eSIM profiles. The number of eSIM profiles may be added to the server 104 by a user of the number of eSIMs while activating the number of eSIMs in the second electronic device 108 for a first time. Furthermore, the process 300 may include an operation of determining a second eSIM profile with an operating status that is active from the number of eSIM profiles stored at the server 104 associated with the second electronic device 108. For determining the second eSIM profile with the active status, the process 300 may include fetching an eUICC ID associated with the number of eSIM profiles using the first MSISDN number as a key.

Further, the process 300 may include fetching the second MSISDN number whose operating status is active associated with the second eSIM profile by using the eUICC ID as a key. The first MSISDN number and the second MSISDN number may be stored in a MSISDN number database in the server 104.

At operation 310, the process 300 may include transmitting a response to the MNO 102. The response may include the second MSISDN number associated with the second eSIM profile whose operating status is active to the MNO 102. The server 104 may transmit the response to the MNO 102 via the SCF.

At operation 312, the process 300 may include an operation of receiving the response from the server 104 including the second MSISDN number associated with the second eSIM profile whose operating status is active.

At operation 314, the process 300 may include an operation of routing the incoming call on the second MSISDN number of the second eSIM profile whose operating status is active. The MNO 102 may transmit the first MSISDN number to the server 104 such that if it is determined that the operating status of the first eSIM profile is inactive, the incoming call may be routed to a second MSISDN number with the second eSIM profile whose operating status is active by the MNO 102. Routing the incoming call to the second eSIM profile may include connecting the first electronic device 106 to a second MNO on the second MSISDN number of the second eSIM profile.

Figure 4:
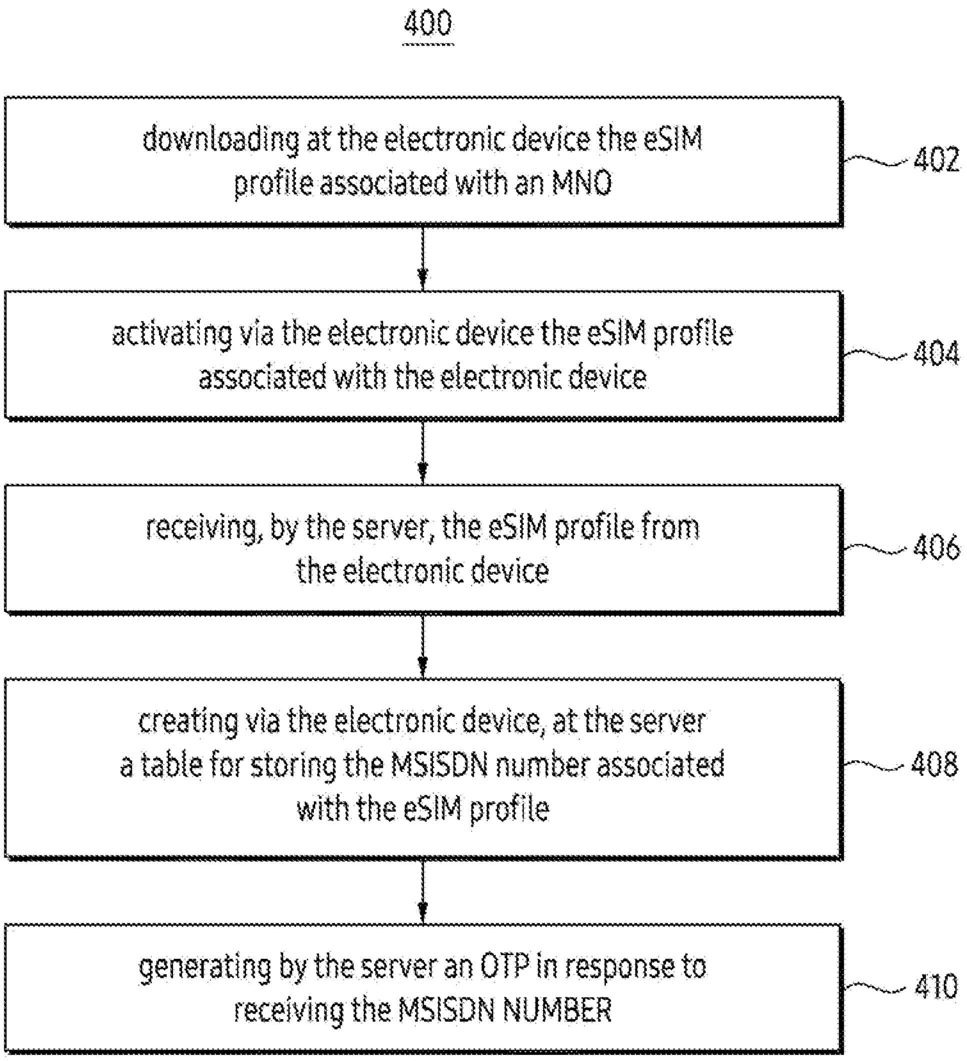
FIG. 4 illustrates an operational flow diagram depicting a process for providing connectivity to an eSIM in an electronic device, in accordance with an embodiment of the present disclosure.

FIG. 4 illustrates an operational flow diagram depicting a process 400 for providing connectivity to an eSIM in an electronic device, in accordance with an embodiment of the present disclosure. The eSIM may include a MSISDN number and the eSIM may be associated with an eSIM profile that may be stored at the server 104. In an embodiment, the electronic device may include a number of eSIMs with an operating status. The operating status may be one of an active status and inactive status. The electronic device may receive an incoming call only when an eSIM profile in the electronic device include the active status.

At operation 402, the process 400 may include an operation of downloading at the electronic device the eSIM profile associated with an MNO. The eSIM may be downloaded by connecting the electronic device to an SM-DP+ address associated with the MNO. For connecting to the SM-DP+ address, the electronic device may scan an MNO subscription and derive the SM-DP+ address.

At operation 404, the process 400 may include an operation of activating via the electronic device the eSIM profile associated with the electronic device. The eSIM profile may be activated using an eSIM Manager in the electronic device.

At operation 406, the process 400 may include an operation of receiving, by the server, the eSIM profile from the electronic device. The eSIM profile may correspond to the MSISDN Number. Further, the process may include associating by the server 104 the eSIM profile with the MSISDN Number by using an eUICC key associated with the eSIM profile. The eSIM profile may be stored at the server 104 corresponding to a unique eUICC ID. The server 104 may keep track of an operating status of the eSIM profile. The operating status may be one of an active status, and an inactive status.

At operation 408, the process 400 may include an operation of creating via the electronic device, at the server 104 a table for storing the MSISDN number associated with the eSIM profile. The electronic device may update a profile status and a pop up may appear on a User Interface for requesting an eSIM user to update the table with a proper MSISDN Number corresponding to the eSIM profile.

At operation 410, the process 400 may include an operation of generating by the server 104 an OTP in response to receiving the MSISDN number, the server 104 may transmit the OTP to the electronic device including the eSIM profile with the MSISDN number. The process 400 may further include an operation of receiving by the server 104, the OTP from the electronic device through the MSISDN number and validating the OTP, the server 104 may mark the MSISDN number as active in the table associated with eSIM profile.

Figure 5:
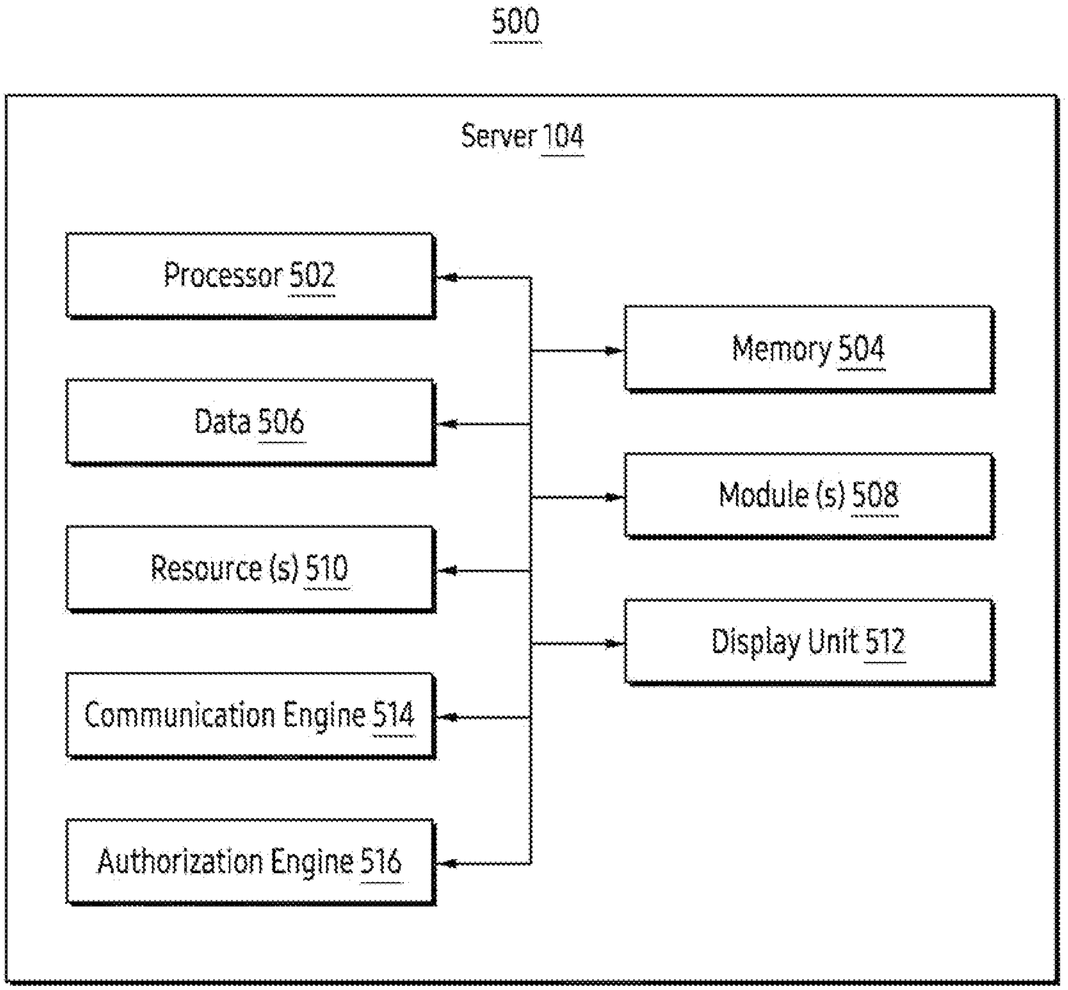
FIG. 5 illustrates a schematic block diagram depicting the server, in accordance with an embodiment of the present disclosure.

FIG. 5 illustrates a schematic block diagram 500 depicting the server 104, in accordance with an embodiment of the present disclosure. The server 104 may be a remote server configured to store a number of eSIM profiles, an operating status of the number of eSIM profiles, and a number of MSISDN number associated with the number of eSIM profiles. The operating status may be one of an active status and an inactive status. The server 104 may communicate with the MNO 102 for sharing an MSISDN number corresponding to an eSIM profile whose operating status is active.

The server 104 may include a processor 502, a memory 504, data 506, module (s) 508, resource(s) 510, a display unit 512, and a communication engine 514. In an embodiment, the processor 502, the memory 504, the data 506, the module(s) 508, the resource(s) 510, the display unit 512, and the communication engine 514.

The server 104 may be one or more of a hardware, a software, a logic-based program, a configurable hardware, and the like. In an example, the processor 502 may be a single processing unit or a number of units, all of which could include multiple computing units. The processor 502 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 502 may fetch and/or execute computer-readable instructions and/or data stored in the memory 504.

In an example, the memory 504 may include any non-transitory computer-readable medium known in the art including, for example, volatile memory, such as Static Random Access Memory (SRAM) and/or Dynamic Random Access Memory (DRAM), and/or non-volatile memory, such as Read-Only Memory (ROM), Erasable Programmable ROM (EPROM), flash memory, hard disks, optical disks, and/or magnetic tapes. The memory 504 may include the data 506. The data 506 serves, among other things, as a repository for storing data processed, received, and generated by one or more of the processor 502, the memory 504, the module (s) 508, the resource (s) 510, the display unit 512, the communication engine 514, and the authorization engine 516.

The module(s) 508, among other things, may include routines, programs, objects, components, data structures, etc., which perform particular tasks or implement data types. The module(s) 508 may also be implemented as, signal processor(s), state machine(s), logic circuitries, and/or any other device or component that manipulate signals based on operational instructions.

Further, the module(s) 508 may be implemented in hardware, as instructions executed by at least one processing unit, e.g., processor 502, or by a combination thereof. The processing unit may be a general-purpose processor that executes instructions to cause the general-purpose processor to perform operations or, the processing unit may be dedicated to performing the required functions. In another aspect of the present disclosure, the module(s) 508 may be machine-readable instructions (software) which, when executed by a processor/processing unit, may perform any of the described functionalities.

In some embodiments, the module(s) 508 may be machine-readable instructions (software) which, when executed by a processor 502/processing unit, perform any of the described functionalities.

The resource(s) 510 may be physical and/or virtual components of the server 104 that provide inherent capabilities and/or contribute towards the performance of the server 104. Examples of the resource(s) 510 may include, but are not limited to, a memory (e.g., the memory 504), a power unit (e.g., a battery), a display unit (e.g., the display unit 512) etc. The resource(s) 510 may include a power unit/battery unit, a network unit, etc., in addition to the processor 502, and the memory 504.

The display unit 512 may display various types of information (for example, media contents, multimedia data, text data, etc.) to the server 104. The display unit 512 may include, but is not limited to, a Liquid Crystal Display (LCD), a Light-Emitting Diode (LED) display, an Organic LED (OLED) display, a plasma cell display, an electronic ink array display, an electronic paper display, a flexible LCD, a flexible electrochromic display, and/or a flexible electrowetting display.

The communication engine 514 may receive a first MSISDN number of a first eSIM profile among number of eSIM profiles in an electronic device. The first MSISDN number may be received from the MNO 102 to obtain an operating status associated with a first eSIM profile via a SCF. In an embodiment, the MNO 102 may transmit the first MSISDN number upon receiving an incoming call from the first electronic device 106 directed towards the second electronic device 108 as referred in the FIG. 1 on the first MSISDN number in the connected to the MNO 102.

The processor 502 may determine that the operating status associated with the first eSIM profile is inactive in response to receiving the first MSISDN number. For fetching the operating status, the processor 502 may fetch an eUICC ID associated with the number of eSIM profiles using the first MSISDN number as a key. Furthermore, the processor 502 may fetch the second MSISDN number whose operating status is active associated with the second eSIM profile by using the eUICC ID as a key.

The communication engine 514 may transmit the second MSISDN number associated with a second eSIM profile whose operating status is active to the MNO 102 via the SCF in response to determining at the operating status associated with the eSIM profile is inactive. The MNO 102 may routes the incoming call from the first electronic device 106 to the second eSIM in response to receiving the second MSISDN with the active status.

In an embodiment of the present disclosure, the communication engine 514 may receive the eSIM profile from an electronic device. The eSIM profile may correspond to the MSISDN Number. Further, the processor 502 may associate the eSIM profile with the MSISDN Number by using an eUICC key associated with the eSIM profile. The eSIM profile may be stored at the server 104 corresponding to a unique eUICC ID. The processor 502 may keep track of an operating status of the eSIM profile. The operating status may be one of an active status, and an inactive status.

The processor 502 may further create a table for storing the MSISDN number associated with the eSIM profile based on a command from a user. The processor 502 may receive updates associated with a profile status. The processor 502 may generate an OTP in response to receiving the MSISDN number. The communication engine 514 may transmit the OTP to the electronic device including the eSIM profile with the MSISDN number. The communication engine 514 may receive the OTP from the electronic device through the MSISDN number and validating the OTP. The processor 502 may mark the MSISDN number as active in the table associated with eSIM profile.

Figure 6:
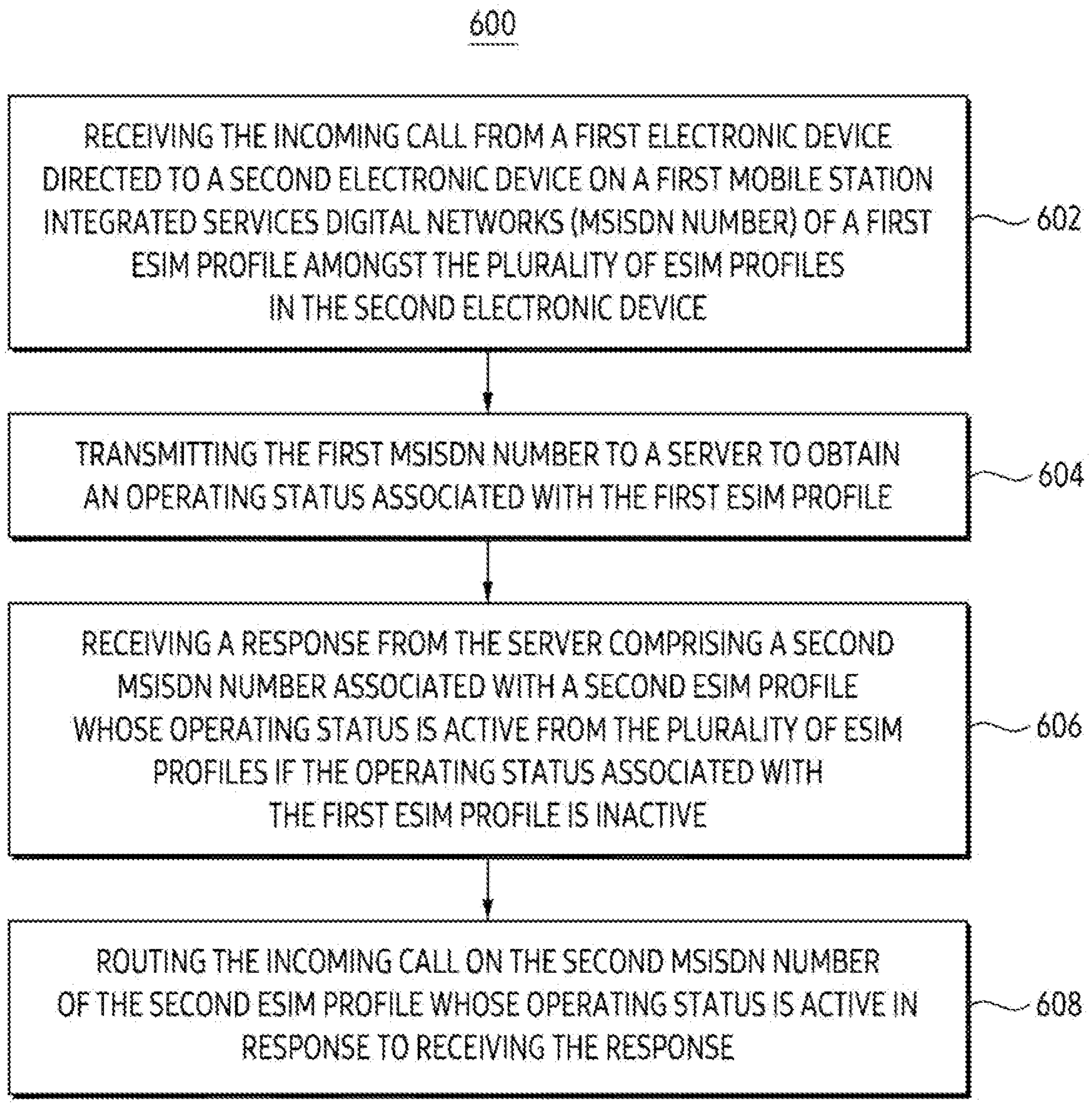
FIG. 6 illustrates a flow diagram depicting a method for managing an incoming call in an eSIM device with a plurality of eSIM profiles, in accordance with an embodiment of the present disclosure.

FIG. 6 illustrates a flow diagram depicting a method 600 for managing an incoming call in an eSIM device with a plurality of eSIM profiles, in accordance with an embodiment of the present disclosure. In an embodiment, the method 600 may be executed by the MNO 102, and the server 104. Details of the present disclosure that are explained in detail in the description of FIG. 1 to FIG. 5 are not explained in detail in the description of FIG. 6.

At operation 602, the method 600 includes an operation of receiving the incoming call from a first electronic device directed to a second electronic device on a first MSISDN number of a first eSIM profile among the plurality of eSIM profiles in the second electronic device.

At operation 604, the method 600 includes an operation of transmitting the first MSISDN number to a server to obtain an operating status associated with the first eSIM profile.

At operation 606, the method 600 includes an operation of receiving a response from the server comprising a second MSISDN number associated with a second eSIM profile whose operating status is active from the plurality of eSIM profiles if the operating status associated with the first eSIM profile is inactive.

At operation 608, the method 600 includes an operation of routing the incoming call on the second MSISDN number of the second eSIM profile whose operating status is active in response to receiving the response.

FIG. 7 illustrates a flow diagram depicting a method 700 implemented at a server for managing an incoming call in an eSIM network, in accordance with an embodiment of the present disclosure. In an embodiment, the method 700 may be executed by the server 104, and the MNO 102. Details of the present disclosure that are explained in detail in the description of FIG. 1 to FIG. 6 are not explained in detail in the description of FIG. 7.

At operation 702, the method 700 includes an operation of receiving a first MSISDN number of a first eSIM profile among a plurality of eSIM profiles in an electronic device from a MNO to obtain an operating status associated with a first eSIM profile, wherein the MNO transmits the first MSISDN number upon receiving the incoming call from a first electronic device directed towards the second electronic device on the first MSISDN number.

At operation 704, the method 700 includes an operation of determining that the operating status associated with the first eSIM profile is inactive in response to receiving the first MSISDN number, wherein the server comprises the plurality of eSIM profiles with the operating status associated with each of the plurality of eSIM profiles.

At operation 706, the method 700 includes an operation of transmitting a second MSISDN number associated with a second eSIM profile among the plurality of eSIM profiles whose operating status is active to the MNO in response to determining at the operating status associated with the eSIM profile is inactive.

Figure 8:
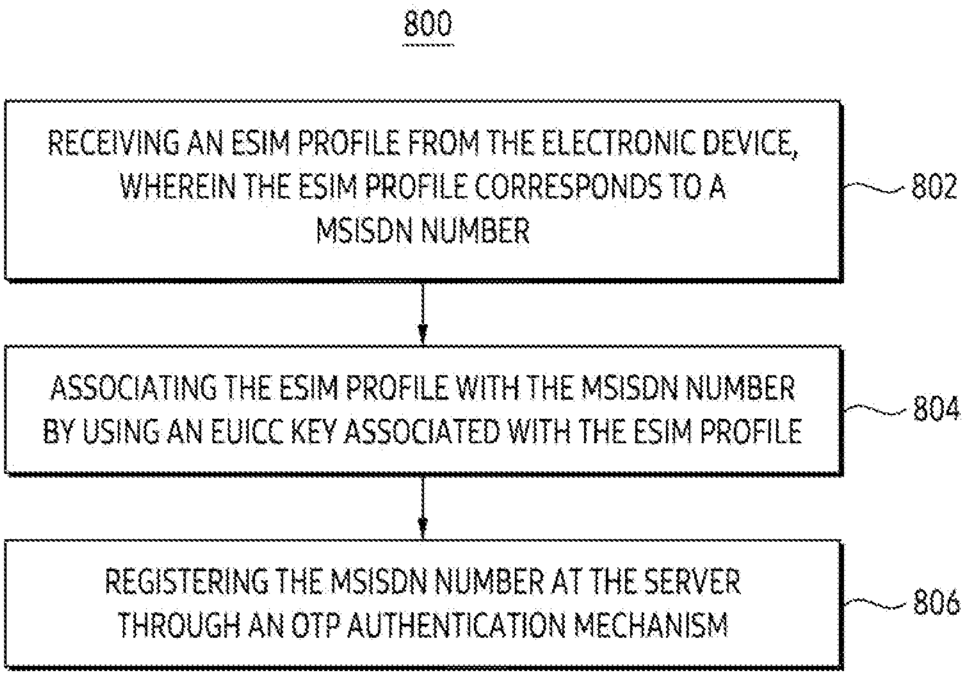
FIG. 8 illustrates a flow diagram depicting a method implemented at a server for providing connectivity to an eSIM in an electronic device, in accordance with an embodiment of the present disclosure.

FIG. 8 illustrates a flow diagram depicting a method 800 implemented at a server for providing connectivity to an eSIM in an electronic device, in accordance with an embodiment of the present disclosure. In an embodiment, the method 700 may be executed by the server 104. Details of the present disclosure that are explained in detail in the description of FIG. 1 to FIG. 7 are not explained in detail in the description of FIG. 8.

At operation 802, the method 800 includes an operation of receiving an eSIM profile from the electronic device, wherein the eSIM profile corresponds to a MSISDN Number.

At operation 804, the method 800 includes an operation of associating the eSIM profile with the MSISDN Number by using an eUICC key associated with the eSIM profile.

At operation 806, the method 800 includes an operation of registering the MSISDN number at the server through an OTP authentication mechanism.

A first electronic device 910 described below may correspond to the first electronic device 106 of FIG. 1. The second electronic device 920 described below may correspond to the second electronic device 108 of FIG. 1. The first server 931 and the second server 932 described below may correspond to the MNO 102 of FIG. 1. The third server 933 described below may be related to the server 104 of FIG. 1

Figure 9:
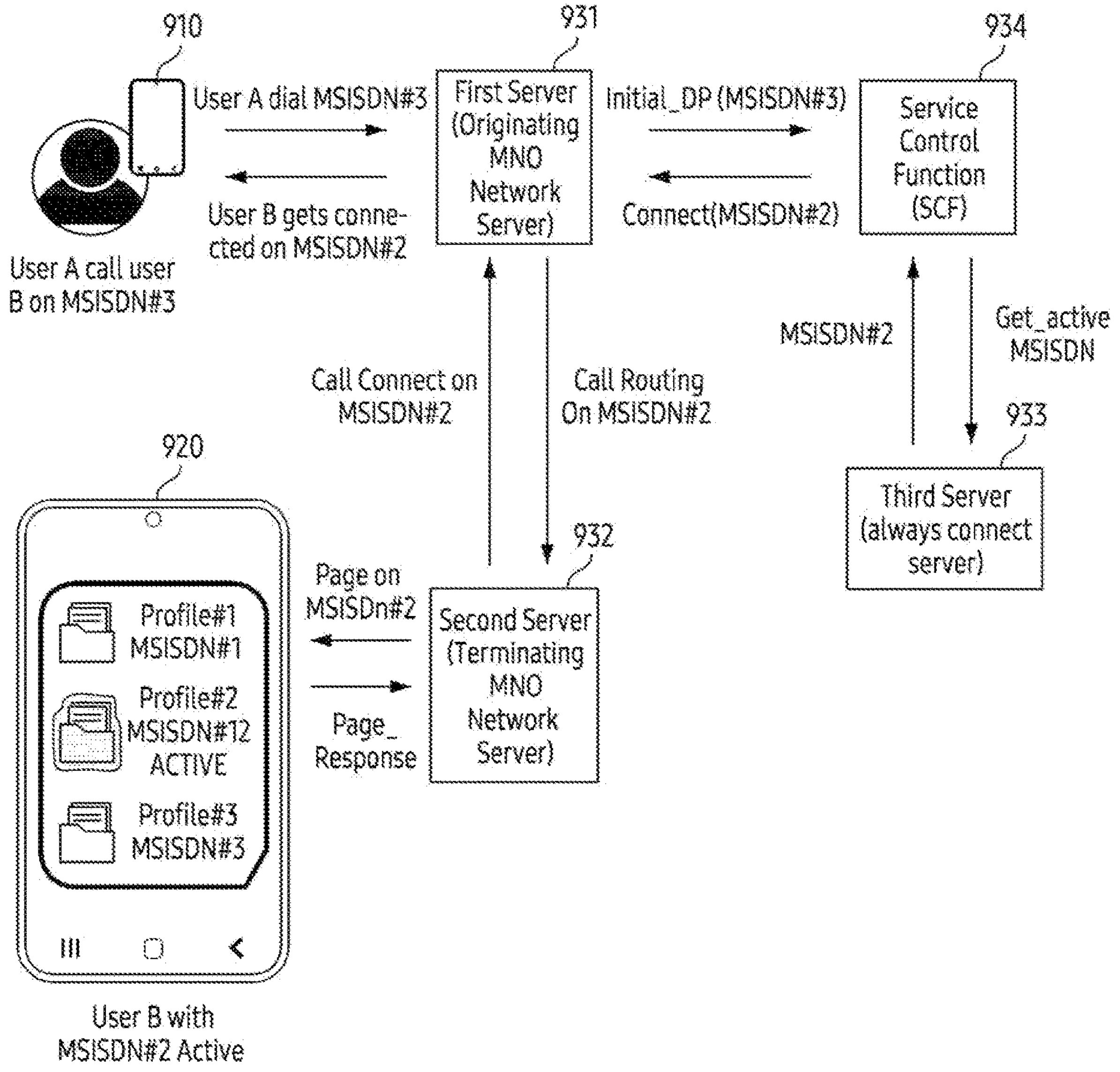
FIG. 9 illustrates a process for a call connection with an electronic device having multiple MSISDNs, in accordance with an embodiment of the present disclosure.

FIG. 9 illustrates a process for a call connection with an electronic device having multiple MSISDNs, in accordance with an embodiment of the present disclosure.

Referring to FIG. 9, a first electronic device 910 may be used by user A. The second electronic device 920 may be used by user B. User B may use three profiles (or eSIM profiles). The second electronic device 920 may have three profiles. For example, Profile #1 to Profile #3 may correspond to MSISDN #1 to MSISDN #3, respectively.

The first electronic device 910 may dial MSISDN #3. The first electronic device 910 may request a phone connection to a first server 931 through MSISDN #3. The first server 931 may be referred to as an originating mobile network operator (MNO) network server. The first server 931 may transmit an initial detection point (DP) message to the service control function (SCF) 934. The initial DP message may include information about MSISDN #3. For example, The SCF 934 may be a network element that contains service Logic which implements the behavior desired by MNOs.

The SCF 934 may obtain (or get/obtain) an active MSISDN from a third server 933. For example, the third server 933 may be referred to as an 'always connect server'. Among the profiles of the second electronic device 920, profile #2 (or MSISDN #2) may be activated. Among the profiles of the second electronic device 920, the remaining profiles (e.g., MSISDN #1 and MSISDN #3) may be deactivated. The SCF 934 may receive (or obtain) information on MSISDN #2 corresponding to the activated profile #2 from the third server 933. The SCF 934 may instruct the first server 931 to connect to MSISDN #2. The first server 931 may perform call routing to a second server 932 through MSISDN #2. Depending on the embodiment, the MNO for the first server 931 and the MNO for the second server 932 may be distinguished.

The second server 932 may page MSISDN #2 to the second electronic device 920. The second server 932 may receive a page response message about MSISDN #2 from the second electronic device 920. The second server 932 may request a phone connection through MSISDN #2 from the first server 931. The first server 931 may provide the first electronic device 910 with a telephone connection through MSISDN #2. User A of the first electronic device 910 and user B of the second electronic device 920 may communicate through a call connection through the first server 931 and the second server 932.

Figure 10:
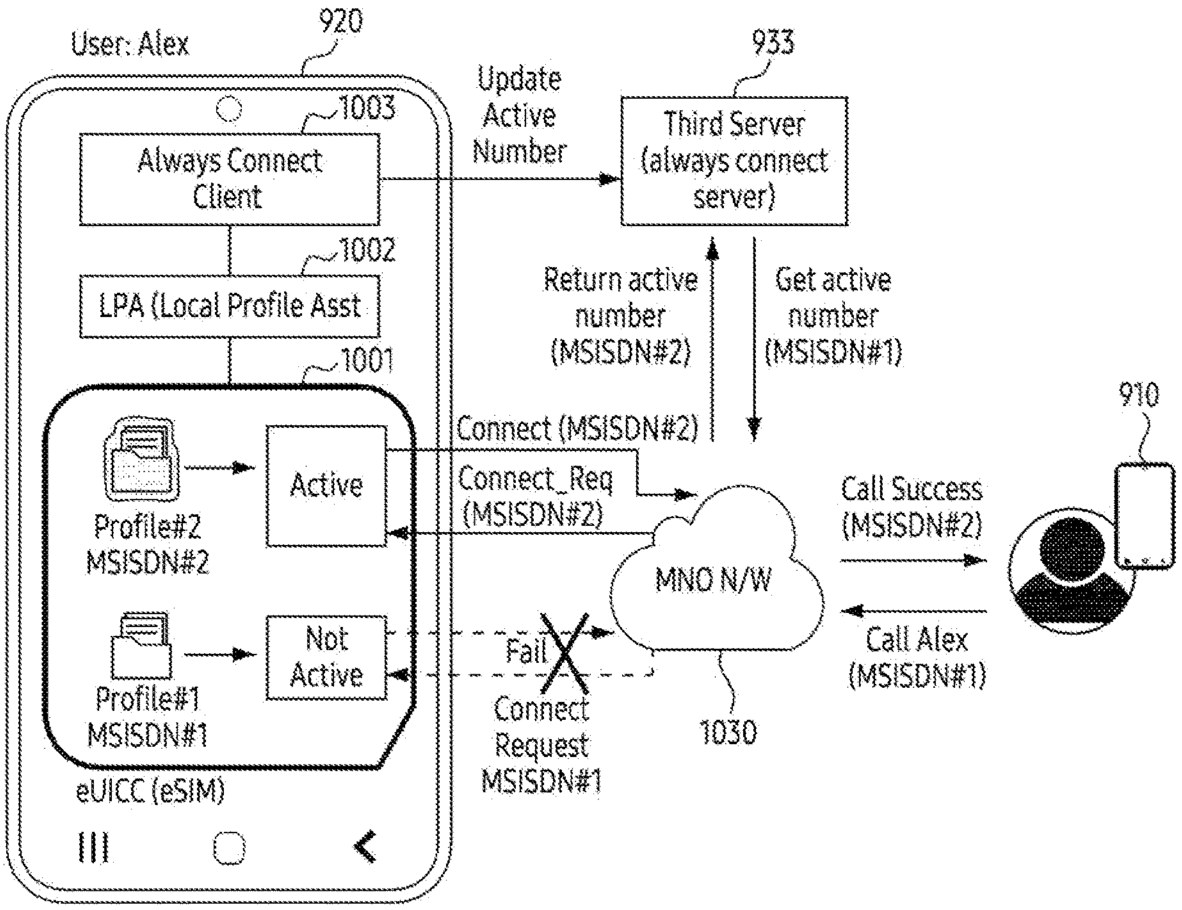
FIG. 10 illustrates a process for a call connection with an electronic device having multiple MSISDNs, in accordance with an embodiment of the present disclosure.

FIG. 10 illustrates a process for a call connection with an electronic device having multiple MSISDNs, in accordance with an embodiment of the present disclosure.

Referring to FIG. 10, a second electronic device 920 may include an eUICC 1001, a local profile assist (LPA) 1002, and an always connect client 1003. A MSISDN #1 may be in a deactivated state, and a MSISDN #2 may be in an active state. The always connect client 1003 may transmit information about an activated MSISDN (or information about an activated number) to a third server 933. The third server 933 may update information on activated MSISDN.

For example, the first electronic device 910 may call MSISDN #1 among a plurality of profiles (or MSISDNs) of the second electronic device 920. Since MSISDN #1 is disabled, a call connection may fail.

A MNO network 1030 may request an activated MSISDN for MSISDN #1 from the third server 933. For example, the MNO network 1030 may include a first server 931 and a second server 932 of FIG. 9.

The third server 933 may provide the MNO network 1030 with information on activated MSISDN (eg, information on MSISDN #2). The MNO network 1030 may attempt a phone connection through MSISDN #2. The second electronic device 920 may transmit a connection response message to the MNO network 1030 through MSISDN #2. The MNO network 1030 may establish the call connection between the first electronic device 910 and the second electronic device 920 based on the connection response message.

Figure 11:
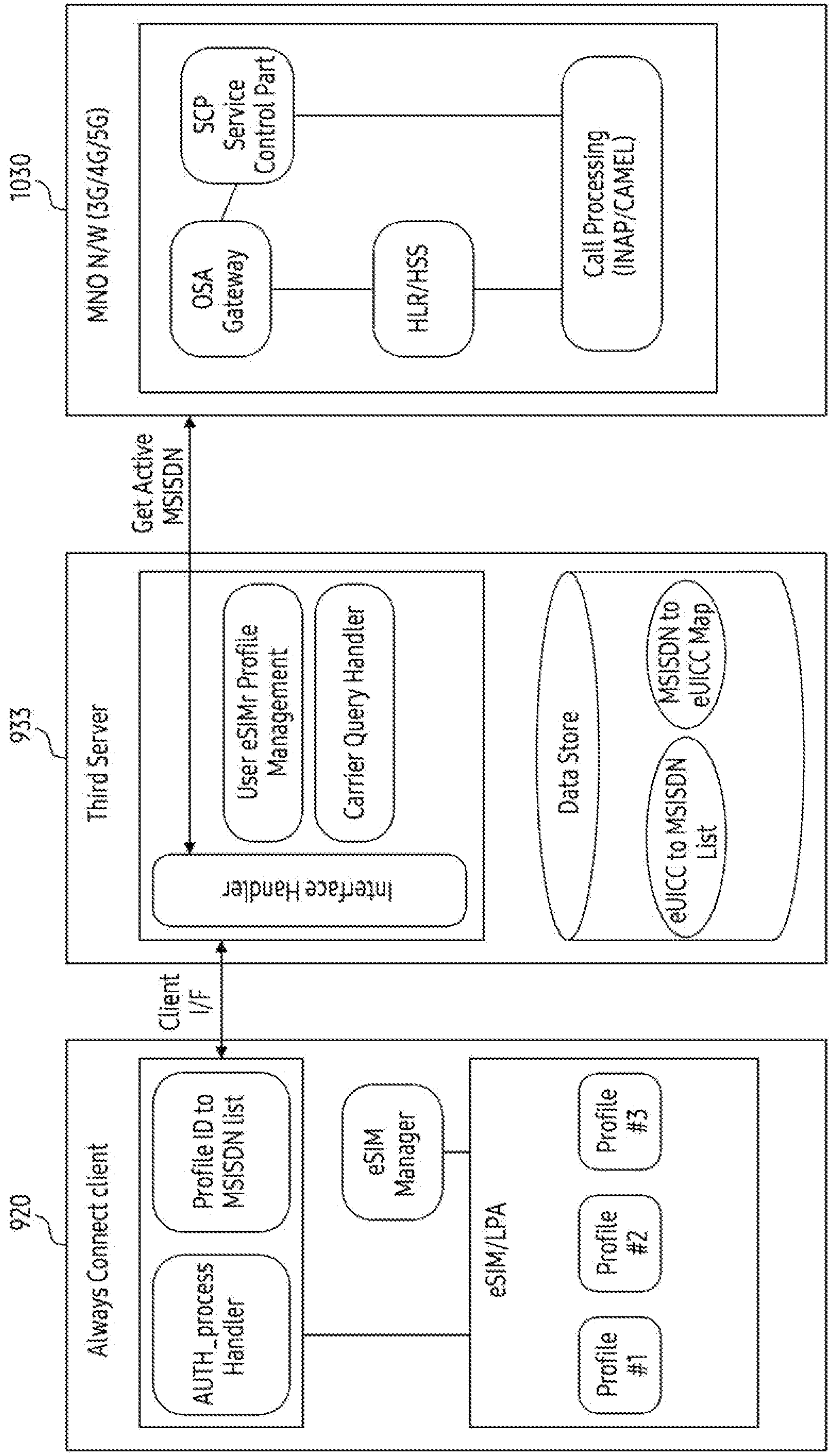
FIG. 11 illustrates an example of a block diagram of a system for a call connection with an electronic device having multiple MSISDNs, in accordance with an embodiment of the present disclosure.

FIG. 11 illustrates an example of a block diagram of a system for a call connection with an electronic device having multiple MSISDNs, in accordance with an embodiment of the present disclosure. The illustrated components may be composed of circuitry.

Referring to FIG. 11, a second electronic device 920 may include an always connect client, an eSIM, a LPA, and an eSIM manager. The always connect client may include information about the AUTH_process handler and profile ID to MSISDN list. The second electronic device 920 (eg, always connect client) may be connected to a third server 933 through a client interface.

The third server 933 may include a data store, interface handler, User eSIM Profile Management, and carrier query handler. The data store may include (or store) information on the eUICC to MSISDN list and/or information on the MSISDN to eUICC map.

A MNO network 1030 may include an open service access gateway, a service control part (SCP), a home location register (HLR)/home subscriber server (HSS), and a call processing unit. The MNO network 1030 may receive information on the activated MSISDN from the third server 933.

Figure 12:
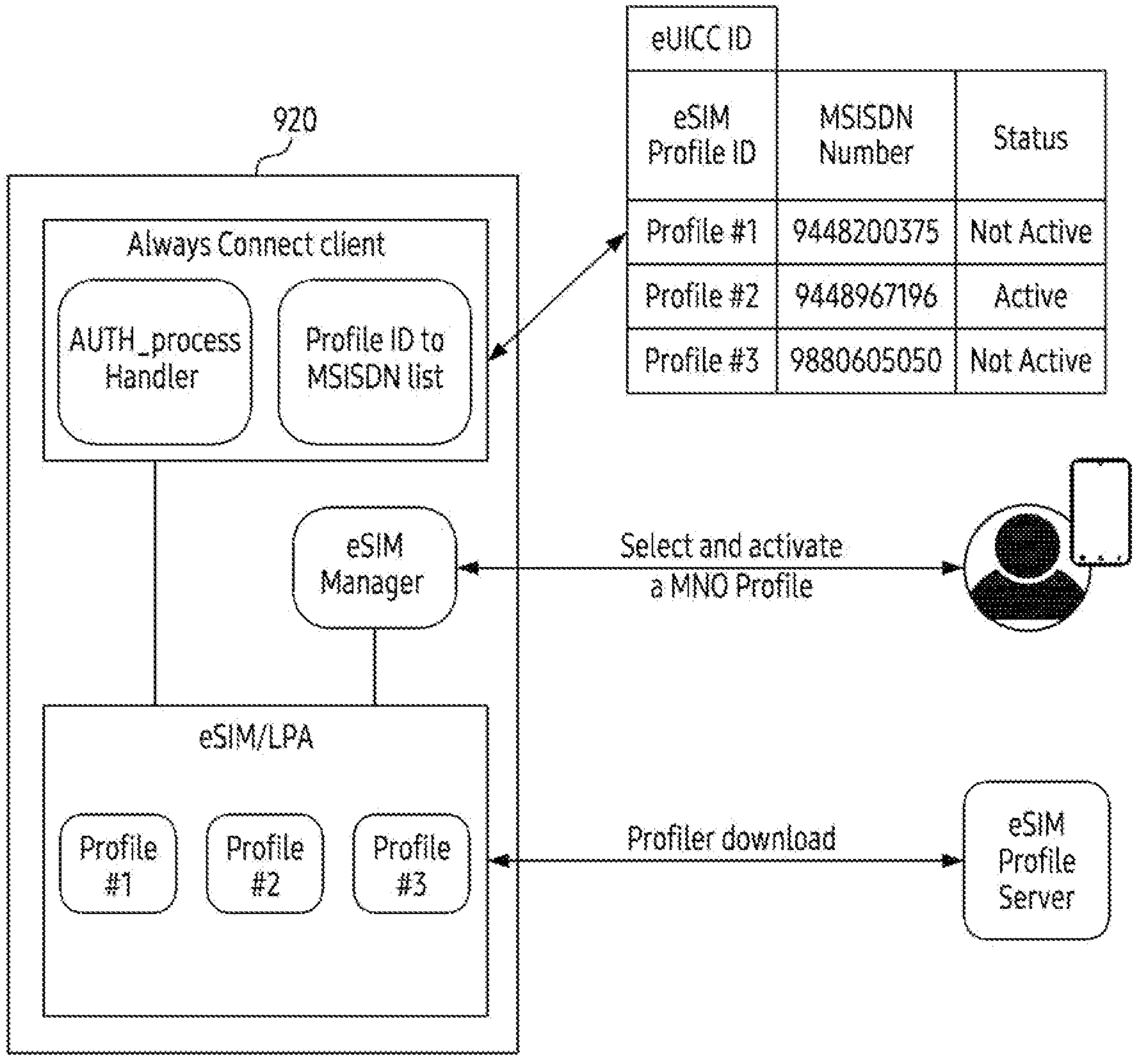
FIG. 12 illustrates an example of an operation of an electronic device having multiple MSISDNs, in accordance with an embodiment of the present disclosure.

FIG. 12 illustrates an example of an operation of an electronic device having multiple MSISDNs, in accordance with an embodiment of the present disclosure.

Referring to FIG. 12, a second electronic device 920 may operate based on a plurality of profiles (or eSIM profiles). The second electronic device 920 may download a plurality of profiles from an eSIM profile server. For example, The eSIM profile server may be referred to as a subscription manager-data preparation+(SM-DP+).

For example, the second electronic device 920 may operate based on three user profiles. A user of the second electronic device 920 may select and activate one of the three profiles. An eSIM manager can select and activate one of the three profiles based on user input. The second electronic device 920 may store the MSISDN corresponding to the profile and the status of the profile using an always connect client. The second electronic device 920 may update information about the profile, the MSISDN corresponding to the profile, and the status of the profile to the third server 933 using the always connect client.

Figure 13:
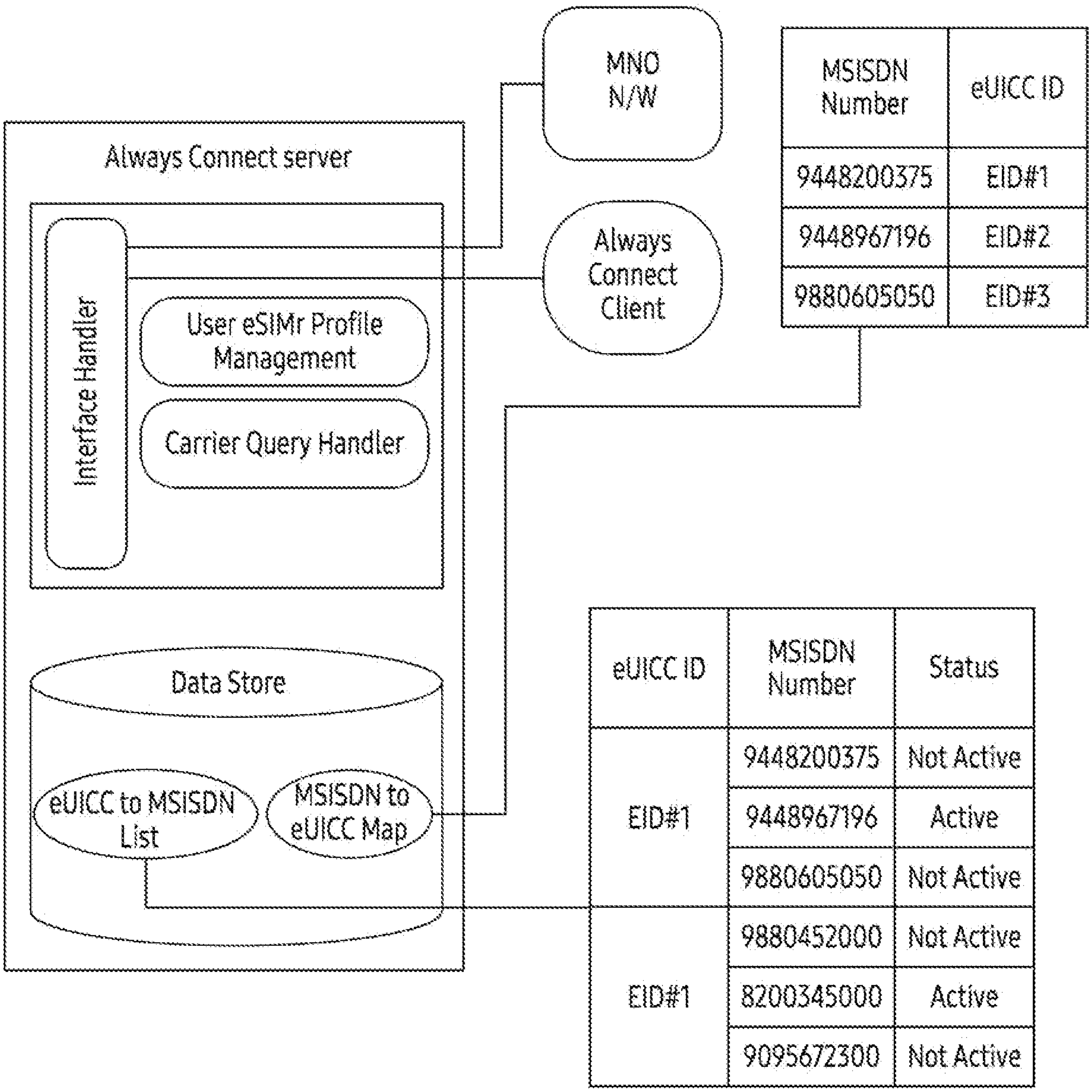
FIG. 13 illustrates an example of the operation of the third server, in accordance with an embodiment of the present disclosure.

FIG. 13 illustrates an example of the operation of the third server, in accordance with an embodiment of the present disclosure.

Referring to FIG. 13, a third server 933 may obtain an MSISDN number and an eUICC (or eUICC identifier, EID). The third server 933 may authenticate the MSISDN using an one time password, OTP, mechanism and store the MSISDN in an active state. The third server 933 may create reverse mapping of MSISDN to EID.

When a MNO network 1030 queries the active MSISDN by transmitting the dialed MSISDN, it can retrieve the corresponding eUICC ID and return the active MSISDN using a table using as a key. When the MNO network 1030 may query for active MSISDN by sending dialed MSISDN, it fetched corresponding eUICC ID and using as the key, may return active MSISDN using the table.

Figure 14:
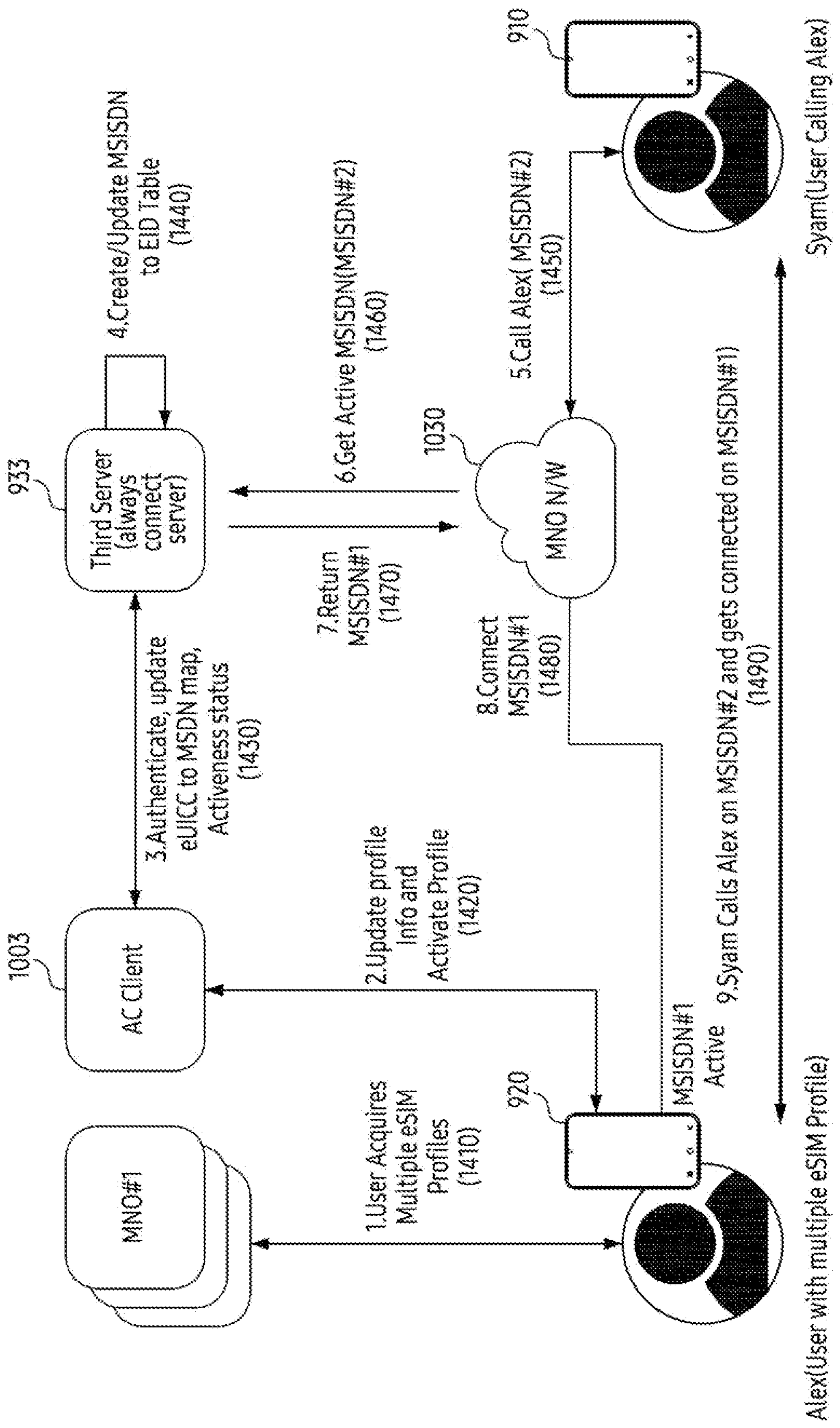
FIG. 14 illustrates a flow to establish a call connection with activate MSISDN, in accordance with an embodiment of the present disclosure.

FIG. 14 illustrates a flow to establish a call connection with activate MSISDN, in accordance with an embodiment of the present disclosure.

At operation 1410, a second electronic device 920 may acquire multiple eSIM profiles from MNOs. For example, the second electronic device 920 may acquire multiple eSIM profiles and store them in eUICC element. This may be done using scanning a MNO Subscription card and deriving SM-DP+ address and securely connecting to right SM-DP+ for downloading a MNO Profile.

At operation 1420, the second electronic device 920 may update profile information and activate profile. The second electronic device 920 (or user of the second electronic device 920) may activate a MNO eSIM profile using 'eSIM manager' which launches always connect client 1003 to update profile status. A pop up may appear on screen of the second electronic device 920 for asking user to update the table with proper MSISDN number corresponding to that MNO Profile.

At operation 1430, a third server 933 authenticate and update eUICC to MSISDN map and activeness status. For example, when user key in the MSISDN number corresponding to the currently active profile (or eSIM profile), the always connect client 1003 may update a table with MSISDN number and may trigger a message to third server 933 passing eUICC ID (EID) and MSISDN number as parameters for creating User MSISDN table using eUICC ID as a key. Before updating the table, the third server 933 may use OTP authorization method (or OTP authorization mechanism) to confirm that the send MSISDN is genuine and belong to the user (or eSIM user). This operation may be repeated each time a profile is activated by the user for the first time. For all the MSISDN numbers, third server 733 may perform a periodic OTP authentication to confirm that all MSISDN numbers have valid subscription with MNOs, when subscription with MNO is not active, it may delete the MSISDN.

At operation 1440, the third server 933 may create and update MSISDN to EID table. For example, after creating eSIM user info, the third server may create the table of MSISDN number to eUICC ID and the table may be used by MNO for querying Active MSISDN Number.

At operation 1450, a first electronic device 910 may initiate the call on the second electronic device 920 using MSISDN #1. For example, a user of the first electronic device 910 is Alex. A user of the second electronic device 920 is Syam. Syam knows Alex by number related to MSISDN #1 only.

At operation 1460, the third server may get (or obtain) active MSISDN (e.g. MSISDN #2). For example, MNO network 1030 may collect dialed digits, and may send query to service control part, SCP by passing MSISDN #1. The SCP may send query to the third server 933 (through its OSA gateway for connecting to 3rd party server) for sending active MSISDN number belonging to eUICC of MSISDN #2.

At operation 1470, the third server 933 may return information on MSISDN #1 to the MNO network 1030. For example, the third server 933 may fetch the eUICC ID (EID) corresponding to the MSISDN #2 and may query MSISDN DB using EID as a key to get active MSISDN for that EID. the third server 933 may send it back MNO network 1030. if there is no record in DB, the third server 933 may send back the same number.

At operation 1480, the MNO network 1030 may connect the call to the second electronic device 920 using MSISDN #2.

At operation 1490, Syam is able to connect to Aleax even though he dialed MSISDN #2 which is not active within Alex eUICC using MSISDN #1 which is active.

Figure 15:
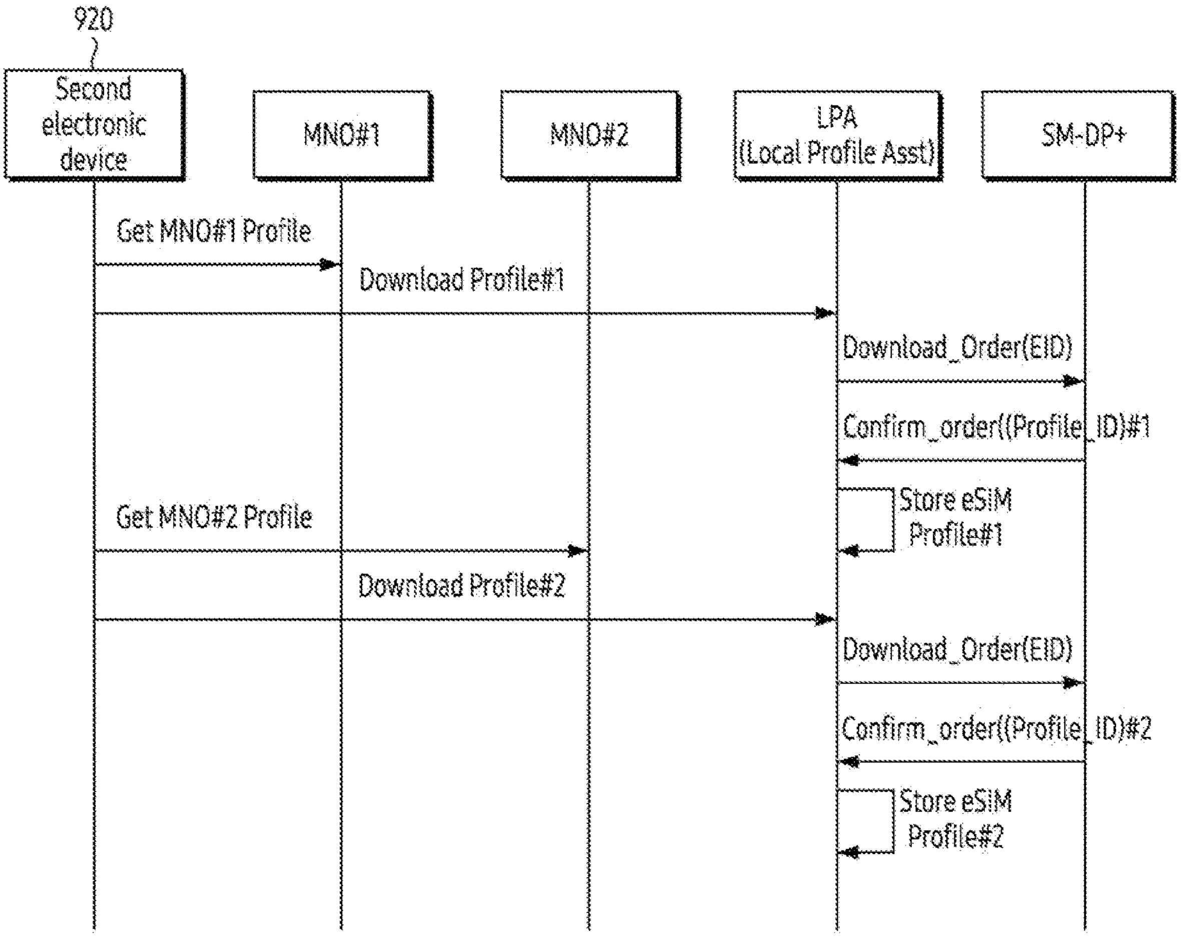
FIG. 15 illustrates a signal flow chart for acquiring multiple profiles in electronic device, in accordance with an embodiment of the present disclosure.

FIG. 15 illustrates a signal flow chart for acquiring multiple profiles in electronic device, in accordance with an embodiment of the present disclosure.

Referring to FIG. 15, a second electronic device 920 may get (or obtain/acquire) profile #1 (or eSIM profile #1) from MNO #1. The second electronic device 920 may download the profile #1 from a local profile assist, LPA. The LPA may transmit a 'download_order' message to a SM-DP+. The SM-DP+ may transmit a 'confirm_order' message to the LPA. The 'confirm_order' message may include information on the profile #1. The LPA may store the profile #1 (or eSIM profile #1) based on the information on the profile #1.

The second electronic device 920 may get (or obtain/acquire) profile #2 (or eSIM profile #2) from MNO #2. The second electronic device 920 may download the profile #2 from the LPA. The LPA may transmit a 'download_order' message to a SM-DP+. The SM-DP+ may transmit a 'confirm_order' message to the LPA. The 'confirm_order' message may include information on the profile #2. The LPA may store the profile #2 (or eSIM profile #2) based on the information on the profile #2.

Figure 16:
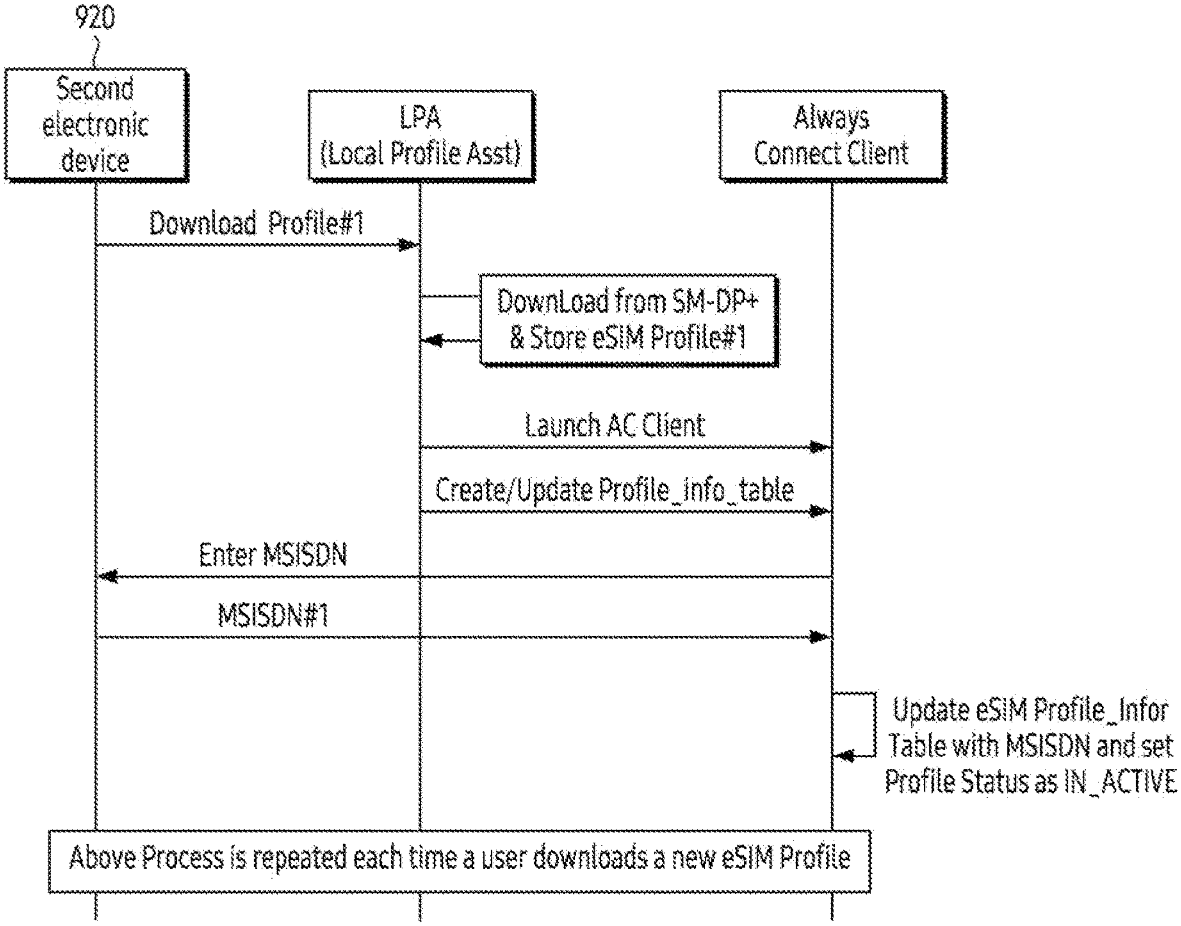
FIG. 16 illustrates a signal flow chart for activating one profile among multiple profiles, in accordance with an embodiment of the present disclosure.

FIG. 16 illustrates a signal flow chart for activating one profile among multiple profiles, in accordance with an embodiment of the present disclosure.

Referring to FIG. 16, a second electronic device 920 may download the profile #1 from a local profile assist, LPA. The LPA may download profile #1 from SM-DP+. After downloading the profile #1, the LPA may store the profile #1. The LPA may launch an 'always connect client'. The LPA may create and update 'profile_info_table'.

The 'always connect client' may request to enter MSISDN. The second electronic device (or eSIM manager of the second electronic device) 920 may transmit information on MSISDN #1 to the 'always connect client'. The 'always connect client' may update 'profile_info_table' with MSISDN and may set profile status as 'IN_ACTIVE'. A process described in FIG. 16 may be repeated each time when a user of the second electronic device downloads a new profile (or eSIM profile).

Figure 17:
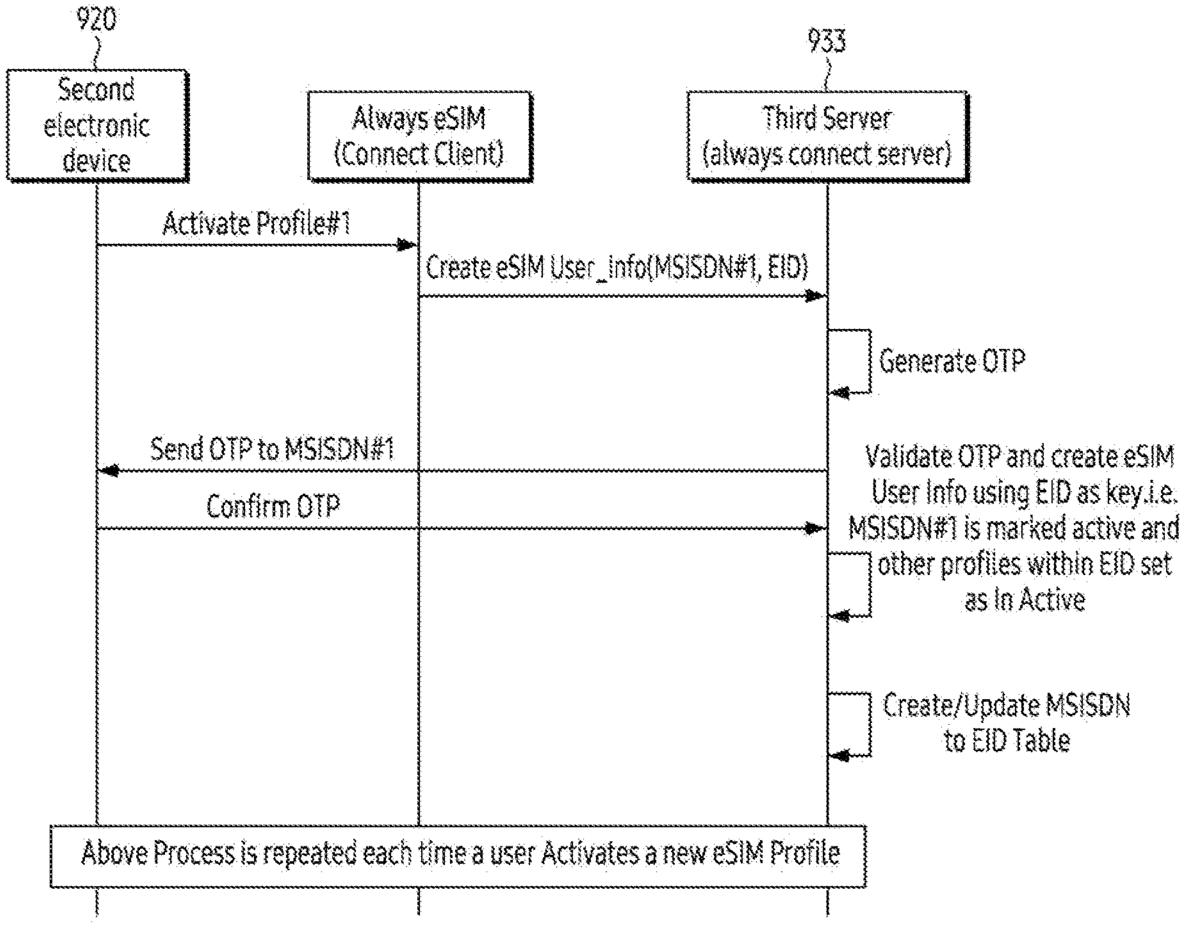
FIG. 17 illustrates a signal flow chart for authenticating a profile, in accordance with an embodiment of the present disclosure.

FIG. 17 illustrates a signal flow chart for authenticating a profile, in accordance with an embodiment of the present disclosure.

Referring to FIG. 17, a second electronic device 920 may request to activate profile #1 to an 'always connect client'. The 'always connect client' may request to create 'eSIM User_info' The 'eSIM User_info' is related to a MSISDN #1. A third server 933 may generate OTP. The third server 933 may send (or transmit) OTP to the second electronic device 920 (e.g. MSISDN #1). The second electronic device 920 may confirm OTP. For example, the second electronic device 920 may transmit a message to confirm OTP.

The third server 933 may validate OTP and may create 'eSIM User_info' using EID as a key. For example, the MSISDN #1 may be marked active and other profiles within EID set as 'In_Active'. The third server 933 may create and update MSISDN to EID table. A process described in FIG. 17 may be repeated each time when a user of the second electronic device activates a new profile (or eSIM profile).

Figure 18:
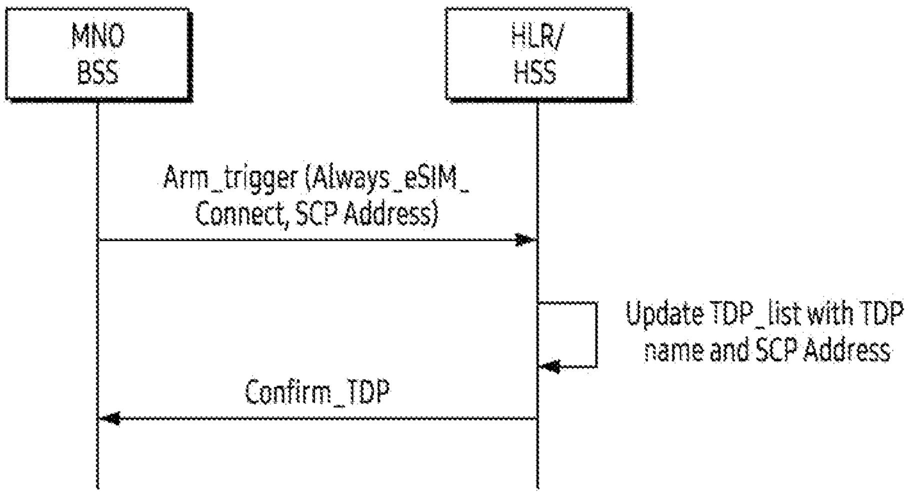
FIG. 18 illustrates a signal flow chart between the MNO and HLR/HSS, in accordance with an embodiment of the present disclosure.

FIG. 18 illustrates a signal flow chart between the MNO and HLR/HSS, in accordance with an embodiment of the present disclosure.

Referring to FIG. 18, a MNO (or MNO business support system, BSS) may arm an 'always_eSIM_connect trigger' in a HLR/HSS. For example, the MNO may transmit an 'arm_tigger' message to the HLR/HSS. The 'arm_tigger' message may include information on SCP address. Based on the message, the HLR/HSS may update 'TDP_list' with TDP name and SCP address. The HLR/HSS may transmit a 'confirm_TDP' message to the MNO.

Figure 19:
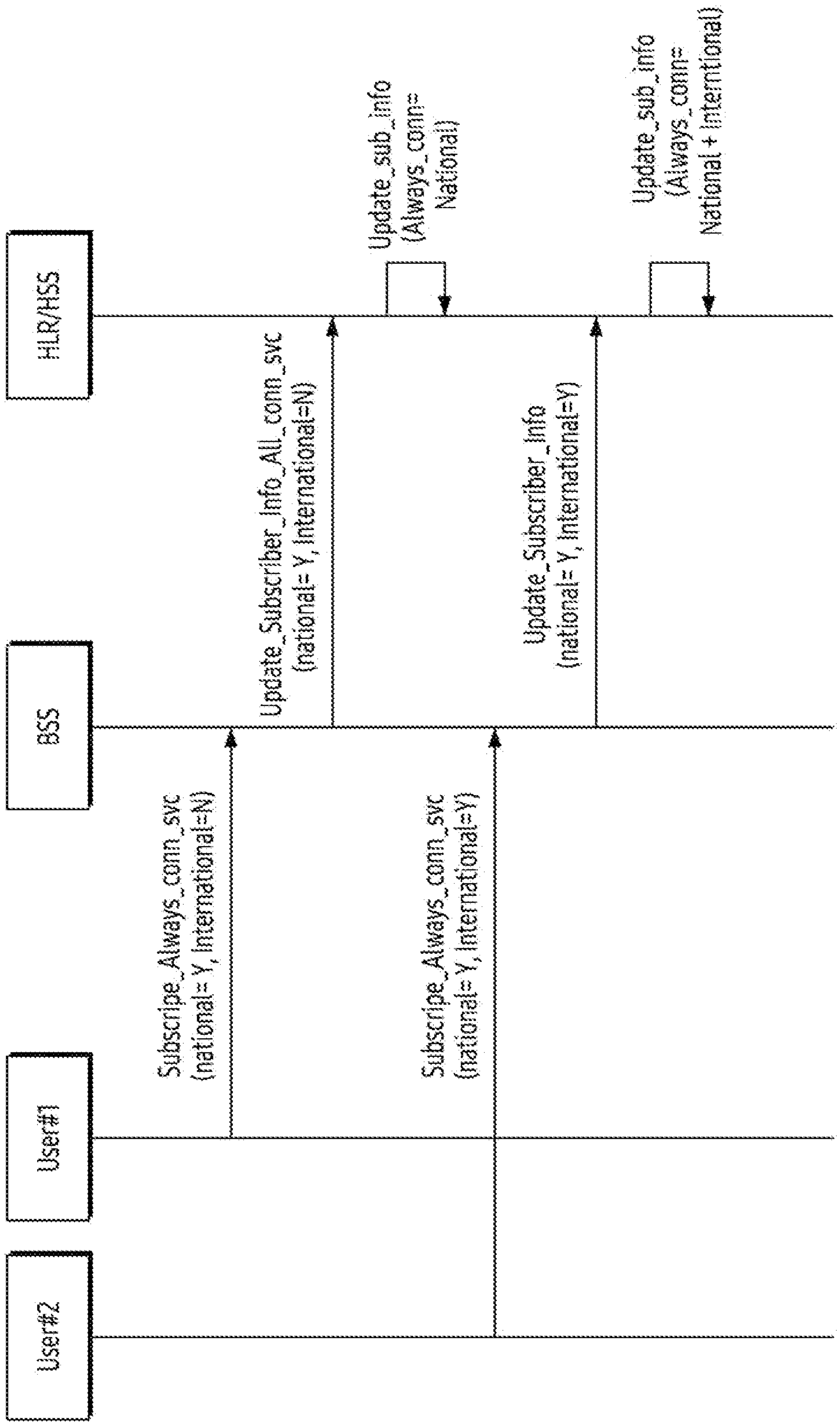
FIG. 19 illustrates a signal flow chart related to a mechanism for MNO to provide Opt-in for eSIM connect, in accordance with an embodiment of the present disclosure.

FIG. 19 illustrates a signal flow chart related to a mechanism for MNO to provide Opt-in for eSIM connect, in accordance with an embodiment of the present disclosure.

Referring to FIG. 19, a MNO can provide option to a user like if the user can be connected to national numbers only or the user can be connected to both national number and international number of called party's other active number.

For example, user #1 may subscribe an 'always connect service'. An electronic device of user #1 may transmit a message to subscribe the 'always connect service'. The user #1 may select an option of the 'always connect service' for connecting to national numbers only. The message may include a parameter 'Subcripe_Always_conn_svc' in which a 'national' field is set to Y(yes) and an 'international' field is set to N(no).

A BSS (or MNO) receive the message from the electronic device of the user #1. Based on receiving the message from the electronic device of the user #1, the BSS may transmit an 'update_subscriber_info_all_conn_svc' message to a HLR/HSS. The 'update_subscriber_info_all_conn_svc' message may include information to update a 'subscriber_info'.

The HLR/HSS may update a 'subscriber_info'(or 'sub_info') based on the 'update_subscriber_info_all_conn_svc' message received from the BSS. An 'always conn' field of the 'subscriber_info' is set to 'National'.

For example, user #2 may subscribe an 'always connect service'. An electronic device of user #2 may transmit a message to subscribe the 'always connect service'. The user #2 may select an option of the 'always connect service' for connecting to both national numbers and international numbers. The message may include a parameter 'Subcripe_Always_conn_svc' in which a 'national' field is set to Y(yes) and an 'international' field is also set to Y(yes).

A BSS (or MNO) receive the message from the electronic device of the user #2. Based on receiving the message from the electronic device of the user #2, the BSS may transmit an 'update_subscriber_info_all_conn_svc' message to a HLR/HSS. The 'update_subscriber_info_all_conn_svc' message may include information to update a 'subscriber_info'.

The HLR/HSS may update a 'subscriber_info'(or 'sub_info') based on the 'update_subscriber_info_all_conn_svc' message received from the BSS. An 'always conn' field of the 'subscriber_info' is set to 'National+International'.

Figure 20:
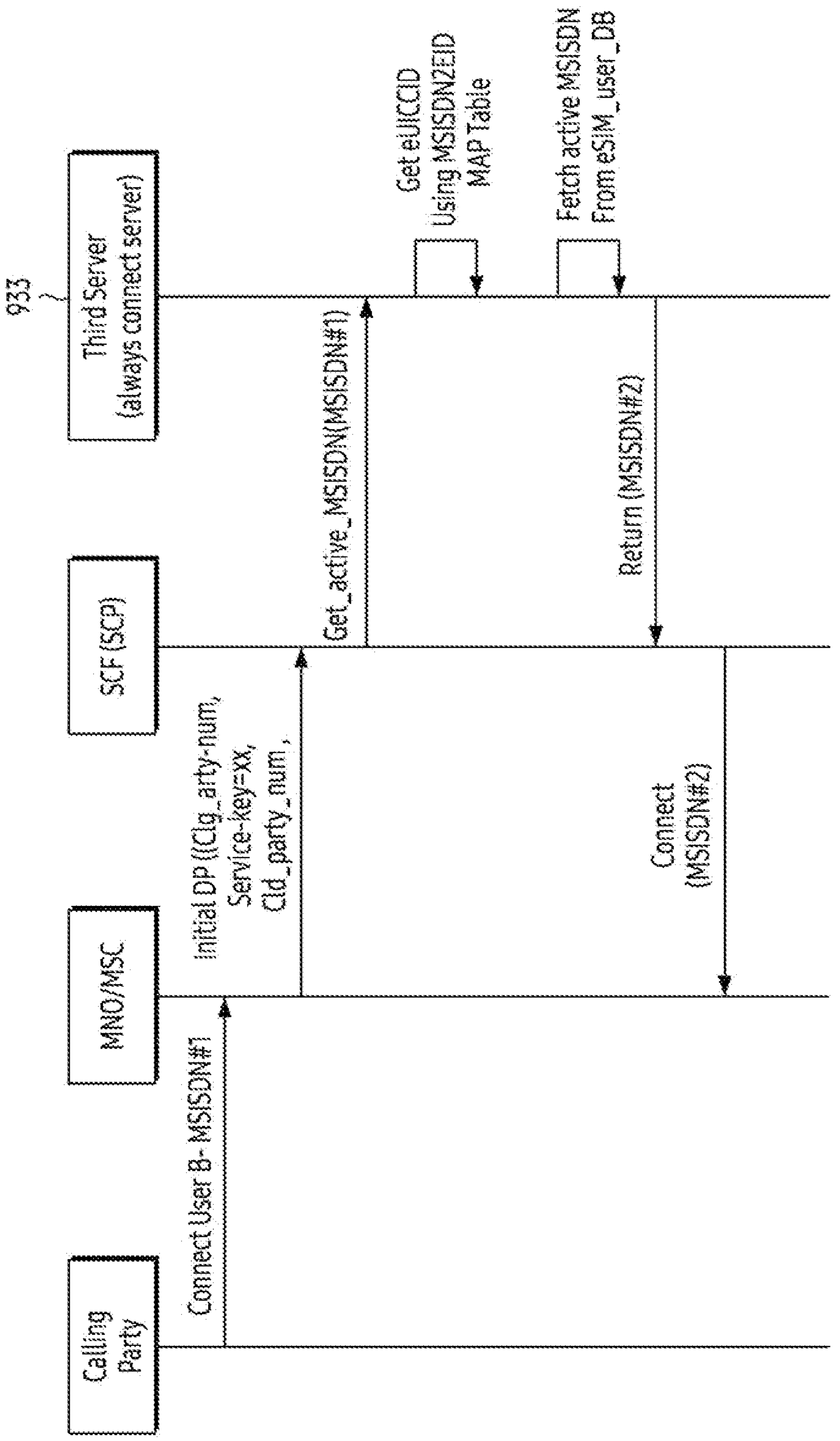
FIG. 20 illustrates a signal flow chart related to a mechanism for fetching an active MSISDN number using any of MSISDN numbers, in accordance with an embodiment of the present disclosure.

FIG. 20 illustrates a signal flow chart related to a mechanism for fetching an active MSISDN number using any of MSISDN numbers, in accordance with an embodiment of the present disclosure.

Referring to FIG. 20, calling party may try to connect MSISDN #1 related to user B. MNO (or mobile switching center, MSC) may transmit an initial DP (detection point) message to SCF (or SCP). The SCF may transmit a 'Get_active_MSISDN' message to a third server 933. The third server may get, based on the 'Get_active_MSISDN' message, eUICC ID, EID using a MSISDN to EID MAP Table. The third server may fetch active MSISDN from 'eSIM_user_DB'. The third server may transmit a 'return' message to the SCF. The 'return' message may include information on MSISDN #2. The SCF may transmit a 'connect' message to the MNO (or MSC).

Figure 21:
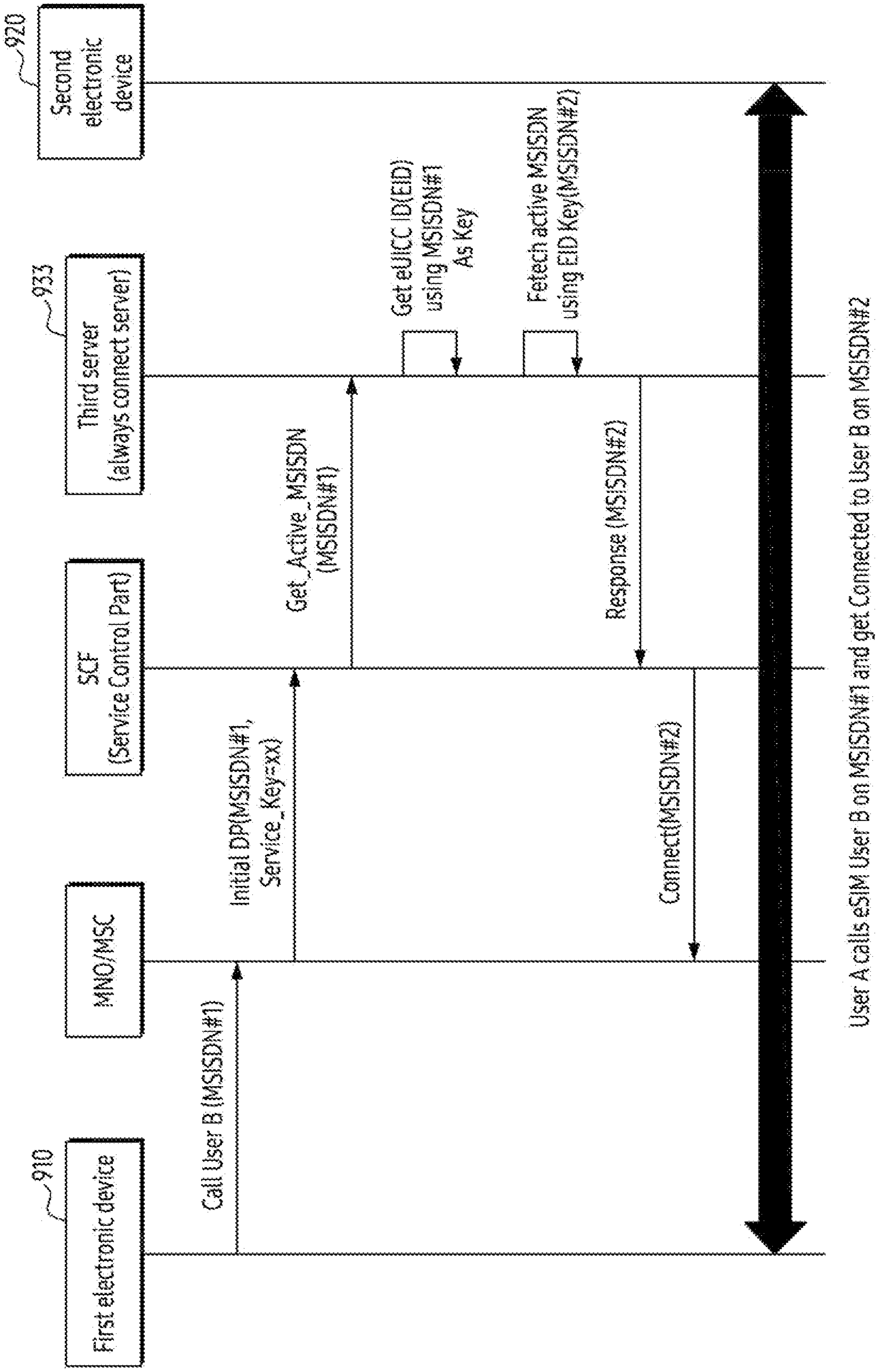
FIG. 21 illustrates a signal flow chart related to a mechanism to connect to an active MSISDN number using any of MSISDN numbers, in accordance with an embodiment of the present disclosure.

FIG. 21 illustrates a signal flow chart related to a mechanism to connect to an active MSISDN number using any of MSISDN numbers, in accordance with an embodiment of the present disclosure.

Referring to FIG. 21, a first electronic device 910 of user A may dial a second electronic device 920 of user B. A MNO may transmit a 'initial DP' message to a service control function, SCF. The 'initial DP' message may include information on MSISDN #1 and information on service key. The SCF may transmit a 'get_active_MSISDN' message to a third server 933. Based on the 'get_active_MSISDN' message, the third server 933 get eUICC ID, EID, using MSISDN #1 as a key. The third server 933 may fetch active MSISDN using EID key. For example, the active MSISDN may be a MSISDN #2.

The third server 933 may transmit a 'response' message to the SCF. The SCF may transmit a 'connect' message to the MNO. Based on a process of an embodiment described in FIG. 21, the user A may call the user b on (or through) MSISDN #1 and may get Connection to the user B on (or through) MSISDN #2.

Figure 22:
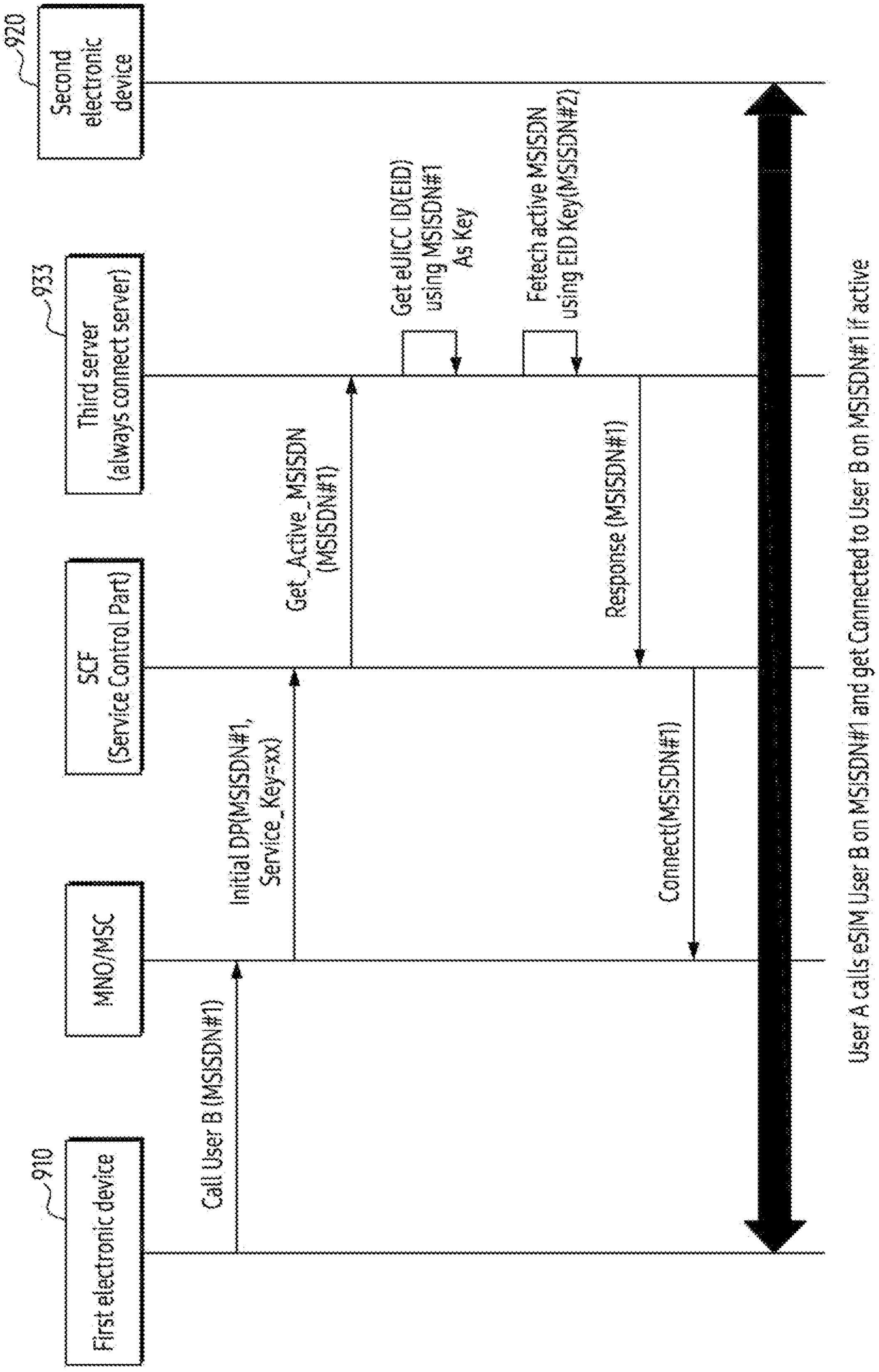
FIG. 22 illustrates a signal flow chart related to a mechanism performed when third server does not find an active MSISDN number using any of MSISDN numbers, in accordance with an embodiment of the present disclosure.

FIG. 22 illustrates a signal flow chart related to a mechanism performed when third server does not find an active MSISDN number using any of MSISDN numbers, in accordance with an embodiment of the present disclosure.

Referring to FIG. 22, a first electronic device 910 of user A may dial a second electronic device 920 of user B. A MNO may transmit a 'initial DP' message to a service control function, SCF. The 'initial DP' message may include information on MSISDN #1 and information on service key. The SCF may transmit a 'get_active_MSISDN' message to a third server 933. Based on the 'get_active_MSISDN' message, the third server 933 get eUICC ID, EID, using MSISDN #1 as a key. The third server 933 may fetch active MSISDN using EID key. For example, the active MSISDN may be a MSISDN #2.

For example, the third server 933 may not find user info for MSIDSN #1. The third server may send back the same MSISDN. The MNO may try to connect call using MSISDN #1 irrespective of that MSISDN is active or not.

Figure 23:
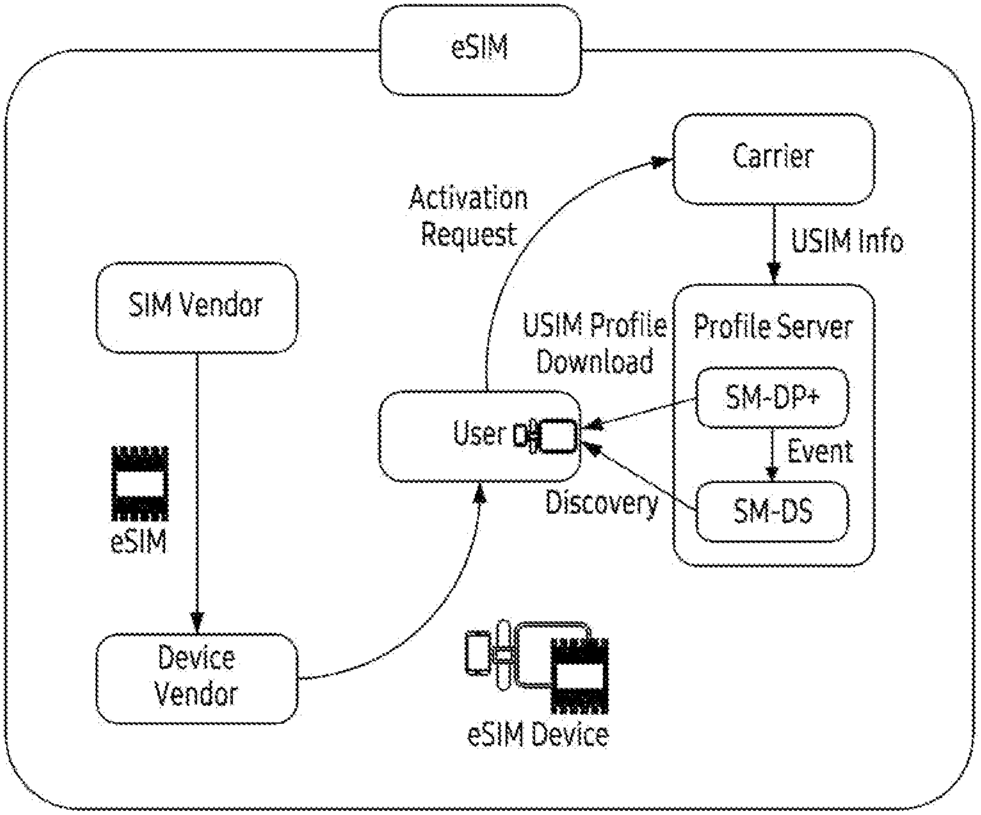
FIG. 23 illustrates an example of a process for acquisition of profile, in accordance with an embodiment of the present disclosure.

FIG. 23 illustrates an example of a process for acquisition of profile, in accordance with an embodiment of the present disclosure.

Referring of FIG. 23, a Sim vendor may provide eSIM to a device vendor. The device vendor may manufacture a device with an eSIM (i.e., an eSIM device). A user may purchase the eSIM device. The user (or an electronic device of the user) may request activation of the eSIM to a carrier. Based on the request, the carrier may transmit USIM information to a profile server (e.g., SM-DP+ or SM-DS). The user may download eSIM profile from the profile server.

Figure 24:
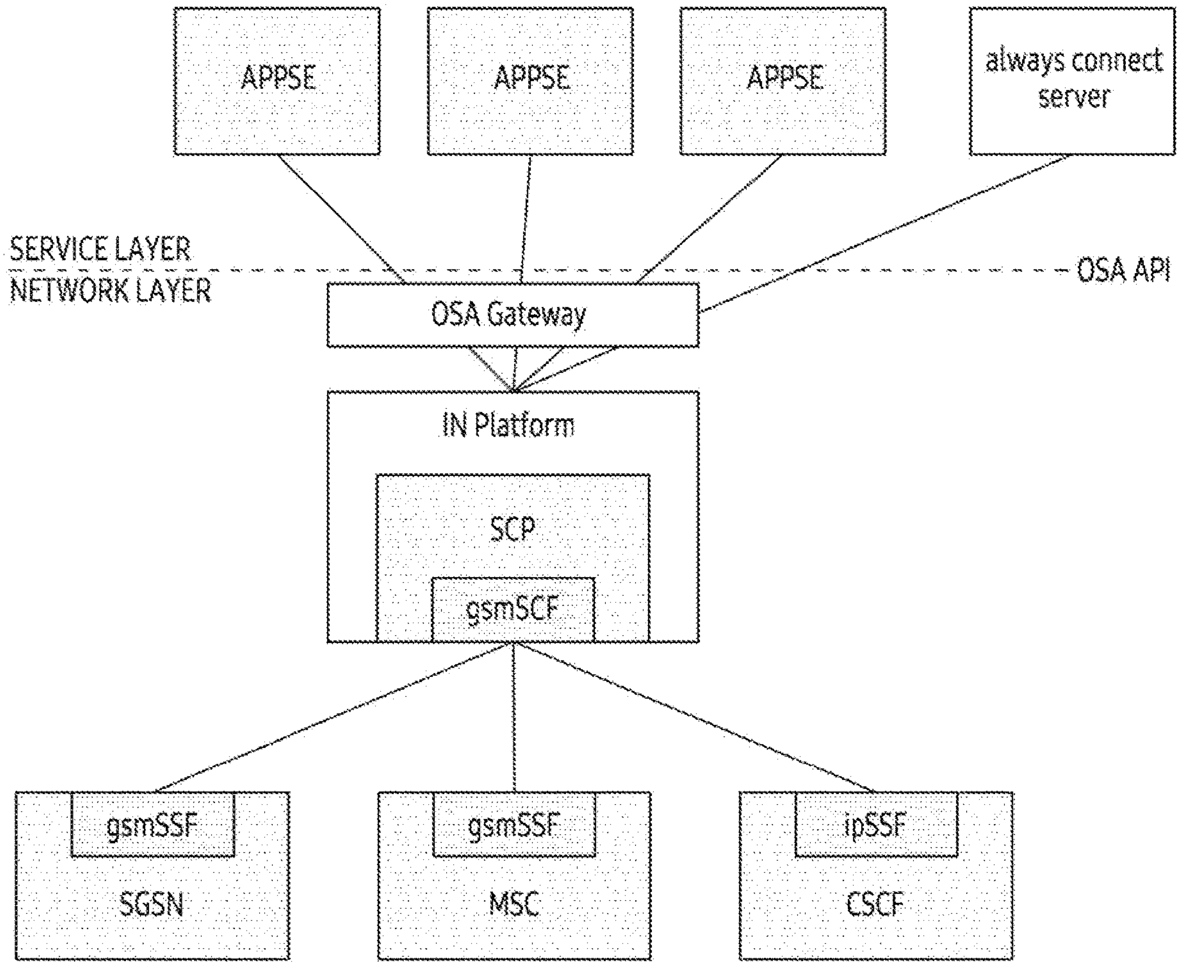
FIG. 24 illustrates an example of an architecture, in accordance with an embodiment of the present disclosure.

FIG. 24 illustrates an example of an architecture, in accordance with an embodiment of the present disclosure.

Referring of FIG. 24, an architecture may be configured based on CAMEL (concise application message exchange language). The architecture may comprise a service layer and a network layer. The service layer may comprise at least one application server, APPSE and 'always connect server' (or third server 933). The at least one APPSE and 'always connect server' may be connected through OSA gateway to 'In platform' comprising a SCP related to a global system for mobile communications service control function, gsmSCF. The SCP may be connected to a serving GPRS support node, SGSN, mobile switching center, MSC, and call session control function, CSCF.

Figure 25:
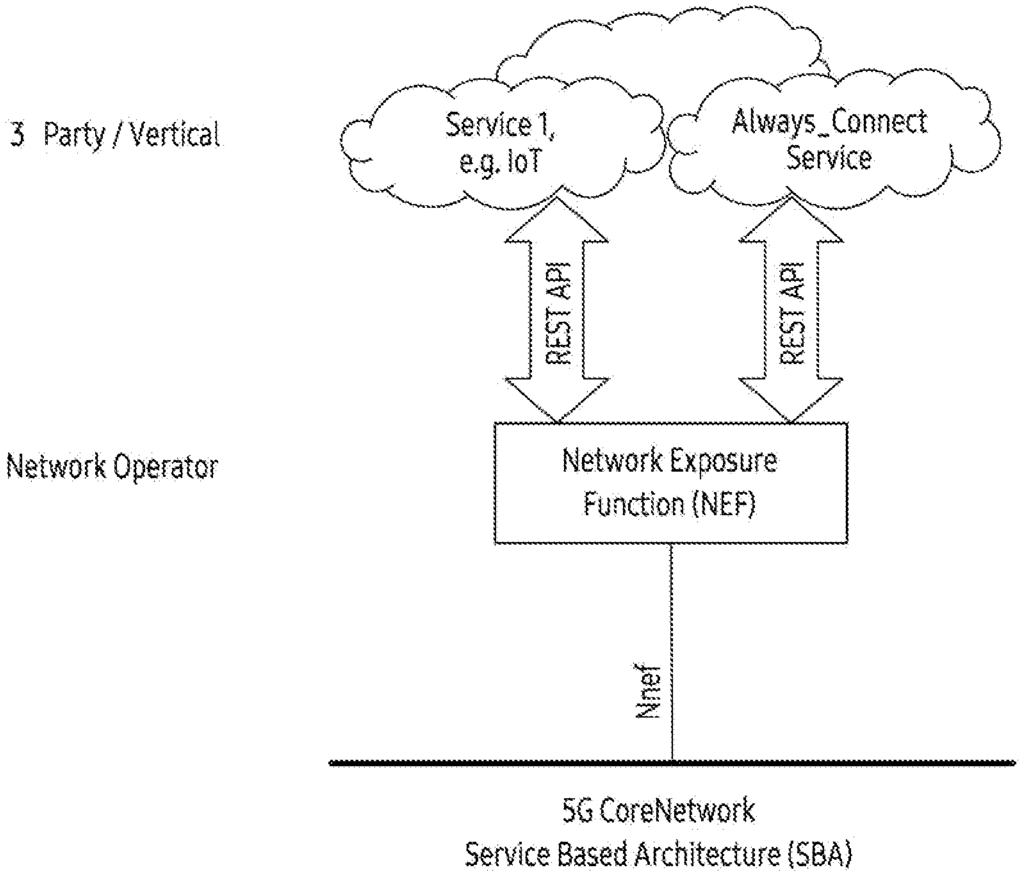
FIG. 25 illustrates an example of 5G network and always connect server interface, in accordance with an embodiment of the present disclosure.

FIG. 25 illustrates an example of 5G network and always connect server interface, in accordance with an embodiment of the present disclosure.

Referring of FIG. 25, a service based architecture, SBA, of 5G core network is related to network exposure function, NEF. The NEF may operate based on neural network exchange format, Nnef. A network operator may comprise the NEF. An 'always connect server', one of a plurality of services related to the NEF, may be configured based on REST API.

For example, a method performed by a Mobile Network Operator (MNO) for managing an incoming call in an embedded Subscriber Identity Module (eSIM) device with a plurality of eSIM profiles, comprises receiving the incoming call from a first electronic device directed to a second electronic device on a first Mobile Station Integrated Services Digital Networks (MSISDN) number of a first eSIM profile among the plurality of eSIM profiles in the second electronic device.

For example, the method comprises transmitting the first MSISDN number to a server to obtain an operating status associated with the first eSIM profile.

For example, the method comprises receiving a response from the server, the response including a second MSISDN number associated with a second eSIM profile whose operating status is active from the plurality of eSIM profiles based on inactive operating status associated with the first eSIM profile For example, the method comprises routing the incoming call on the second MSISDN number of the second eSIM profile whose operating status is active in response to receiving the response.

For example, the MNO and the server communicate with one another via a Service Controller Function (SCF).

For example, routing the incoming call to the second eSIM profile comprises connecting the first electronic device to a second MNO on the second MSISDN number of the second eSIM profile.

For example, a method performed by a server for managing an incoming call in an eSIM network, comprises receiving a first MSISDN number of a first eSIM profile among a plurality of eSIM profiles in an electronic device from a Mobile Network Operator (MNO) to obtain an operating status associated with a first eSIM profile.

For example, the method comprises determining that the operating status associated with the first eSIM profile is inactive in response to receiving the first MSISDN number.

For example, the server is configured to include the plurality of eSIM profiles and provide the operating status associated with each of the plurality of eSIM profiles.

For example, the method comprises transmitting a second MSISDN number associated with a second eSIM profile among the plurality of eSIM profiles whose operating status is active to the MNO in response to determining at the operating status associated with the eSIM profile is inactive.

For example, the MNO is configured to route the incoming call from the first electronic device to the second eSIM in response to receiving the second MSISDN number with the active status.

For example, the transmitting the second MSISDN number is based on fetching an embedded Universal Integrated Circuit Card (eUICC) Identification (ID) associated with the plurality of eSIM profiles using the first MSISDN number as a key and fetching, by the server, the second MSISDN number whose operating status is active associated with the second eSIM profile by using the eUICC ID as a key.

For example, the method comprises updating an operating status of the eSIM profile to the active status in response to determining that the electronic device is switched to the eSIM profile by a user.

For example, the method comprises downloading eSIM profile associated with the MNO by connecting the electronic device to an SM-DP+ address associated with the MNO.

For example, the method comprises after an eSIM profile associated with the MNO is downloaded at the electronic device, identifying that the eSIM profile associated with the electronic device is activated.

For example, the method comprises creating a table the eSIM profile for storing the MSISDN number associated with the eSIM profile.

For example, the method comprises updating the table based on marking the MSISDN number as active in the table associated with eSIM profile.

For example, the eSIM profile is downloaded from SM-DP+ associated with the MNO.

For example, one of the plurality of eSIM profiles is activated.

For example, remaining eSIM profiles of the plurality of eSIM profiles are inactivated.

For example, the method comprises activating the eSIM profile associated with the electronic device.

For example, the method comprises creating, at the server, a table the eSIM profile for storing the MSISDN number associated with the eSIM profile.

For example, the creating, at the server, the table comprises: generating an One Time Password (OTP) in response to receiving the MSISDN number, transmitting the OTP to the second electronic device comprising the eSIM profile with the MSISDN number, receiving the OTP from the second electronic device through the MSISDN number and validating the OTP, and marking the MSISDN number as active in the table associated with eSIM profile.

For example, a Mobile Network Operator (MNO) for managing an incoming call in an eSIM device with a plurality of eSIM profiles, the MNO comprises a processor.

For example, the processor is configured to cause the MNO to receive the incoming call from a first electronic device directed to a second electronic device on a first Mobile Station Integrated Services Digital Networks (MSISDN) number of a first eSIM profile among the plurality of eSIM profiles in the second electronic device.

For example, the processor is configured to cause the MNO to transmit the first MSISDN number to a server to obtain an operating status associated with the first eSIM profile.

For example, the processor is configured to cause the MNO to receive a response from the server including a second MSISDN number associated with a second eSIM profile whose operating status is active from the plurality of eSIM profiles based on inactive operating status associated with the first eSIM profile.

For example, the processor configured to cause the MNO to route the incoming call on the second MSISDN number of the second eSIM profile whose operating status is active in response to receiving the response.

For example, the server comprises the plurality of eSIM profiles and provides the operating status associated with each of the plurality of eSIM profiles.

For example, the MNO and the server communicate with one another via a Service Controller Function (SCF).

For example, the processor is configured to cause the MNO to connect the first electronic device to a second MNO on the second MSISDN number of the second eSIM profile.

For example, a server for managing an incoming call in an eSIM network, the server comprising a processor.

For example, the processor is configured to cause the server to receive a first MSISDN number of a first eSIM profile among a plurality of eSIM profiles in an electronic device from a MNO to obtain an operating status associated with a first eSIM profile.

For example, the MNO is configured to transmit the first MSISDN number upon receiving the incoming call from a first electronic device directed towards the second electronic device on the first MSISDN number.

For example, the processor is configured to cause the server to determine that the operating status associated with the first eSIM profile is inactive in response to receiving the first MSISDN number.

For example, the server is configured to include the plurality of eSIM profiles and provide the operating status associated with each of the plurality of eSIM profiles.

For example, the processor is configured to cause the server to transmit a second MSISDN number associated with a second eSIM profile among the plurality of eSIM profiles whose operating status is active to the MNO in response to determining at the operating status associated with the eSIM profile is inactive.

For example, the MNO is configured to route the incoming call from the first electronic device to the second eSIM in response to receiving the second MSISDN number with the active status.

For example, the processor is configured to cause the server to transmit the second MSISDN number is based on fetching an embedded Universal Integrated Circuit Card (eUICC) ID associated with the plurality of eSIM profiles using the first MSISDN number as a key and fetching the second MSISDN number whose operating status is active associated with the second eSIM profile by using the eUICC ID as a key.

For example, a server for providing connectivity to an eSIM in an electronic device, the server comprises a processor.

For example, the processor is configured to cause the server to receive an eSIM profile from the electronic device, wherein the eSIM profile corresponds to a MSISDN number.

For example, the processor is configured to cause the server to associate the eSIM profile with the MSISDN number by using an eUICC key associated with the eSIM profile.

For example, the processor is configured to cause the server to register the MSISDN number at the server through an OTP authentication mechanism.

For example, the processor is configured to cause the server to update an operating status of the eSIM profile to the active status in response to determining that the electronic device is switched to the eSIM profile by a user.

For example, the processor is configured to cause the server to download, at the electronic device, eSIM profile associated with the MNO by connecting the electronic device to an SM-DP+ address associated with the MNO.

For example, the processor is configured to cause the server to activate, via the electronic device, the eSIM profile associated with the electronic device.

For example, the processor is configured to cause the server to create, via the electronic device, at the server a table the eSIM profile for storing the MSISDN number associated with the eSIM profile.

For example, the processor is configured to cause the server to generate an One Time Password (OTP) in response to receiving the MSISDN number.

For example, the processor is configured to cause the server to transmit the OTP to the second electronic device comprising the eSIM profile with the MSISDN number.

For example, the processor is configured to cause the server to receive the OTP from the second electronic device through the MSISDN number and validating the OTP; and marking the MSISDN number as active in the table associated with eSIM profile.

For example, the processor is further configured to cause the server to update the table based on marking the MSISDN number as active in the table associated with eSIM profile.

For example, the processor is further configured to cause the server to identify subscription information associated the electronic device.

For example, the processor is further configured to identify, based on the subscription information, whether each of the plurality of eSIM profiles is related to a national MSISDN number.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

For one or more embodiments, at least one of the components set forth in one or more of the preceding figures may be configured to perform one or more operations, techniques, processes, and/or methods as set forth herein. For example, a processor (e.g., baseband processor) as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium (e.g., non-transitory storage medium) are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network, such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a proposed specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

Meanwhile, specific embodiments have been described in the detailed description of the disclosure, but it goes without saying that various modifications are possible without departing from the scope of the disclosure.

What is claimed is:

1. A method performed by a server for managing a call initiated by a first electronic device and directed to a second electronic device configured to receive the call in an embedded Subscriber Identity Module (eSIM) network, the method comprising:

receiving, from a Mobile Network Operator (MNO), a first Mobile Station Integrated Services Digital Networks (MSISDN) number of a first eSIM profile among a plurality of eSIM profiles in the second electronic device to obtain an operating status associated with the first eSIM profile, determining that the operating status associated with the first eSIM profile is inactive based on the first MSISDN number received by the server, wherein the server is configured to include the plurality of eSIM profiles and provide an operating status associated with each of the plurality of eSIM profiles in the second electronic device; and transmitting, to the MNO, a second MSISDN number associated with a second eSIM profile among the plurality of eSIM profiles whose operating status is active based on determining that the operating status associated with the first eSIM profile is inactive, wherein the operating status of the first eSIM profile in the server is updated from an inactive status to an active status based on determining that the first eSIM profile in the second electronic device is activated.

2. The method of claim 1, wherein the MNO is configured to route the call from the first electronic device to the second eSIM profile based on receiving the second MSISDN number with the active status.

3. The method of claim 1, wherein the transmitting the second MSISDN number is based on:

fetching an embedded Universal Integrated Circuit Card (eUICC) Identification (ID) associated with the plurality of eSIM profiles using the first MSISDN number as a key; and fetching, by the server, the second MSISDN number whose operating status is active associated with the second eSIM profile by using the eUICC ID as a key.

4. The method of claim 1, further comprising:

after an eSIM profile associated with the MNO is downloaded at the second electronic device, identifying that the eSIM profile associated with the second electronic device is activated; and creating a table for the eSIM profile to store a MSISDN number associated with the eSIM profile.

5. The method of claim 4, wherein the creating, at the server, the table comprises:

generating an One Time Password (OTP) based on receiving the MSISDN number;

transmitting the OTP to the second electronic device comprising the eSIM profile with the MSISDN number;

receiving the OTP from the second electronic device through the MSISDN number and validating the OTP; and marking the MSISDN number as active in the table associated with the eSIM profile.

6. The method of claim 5, further comprising updating the table based on marking the MSISDN number as active in the table associated with the eSIM profile.

7. The method of claim 4, wherein the eSIM profile is downloaded from SM-DP+ associated with the MNO.

8. The method of claim 1, further comprising:
identifying subscription information associated with the second electronic device, and
identifying, based on the subscription information, whether each of the plurality of eSIM profiles is related to a national MSISDN number.

9. The method of claim 1, wherein one of the plurality of eSIM profiles is activated, and
wherein remaining eSIM profiles of the plurality of eSIM profiles are inactivated.

10. A server for managing a call initiated by a first electronic device and directed to a second electronic device configured to receive the call in an embedded Subscriber Identity Module (eSIM) network, the server comprising a processor configured to cause the server to:
receive, from a Mobile Network Operator (MNO), a first MSISDN number of a first eSIM profile among a plurality of eSIM profiles in the second electronic device to obtain an operating status associated with the first eSIM profile, wherein the MNO is configured to transmit the first MSISDN number upon receiving the call from the first electronic device directed towards the second electronic device on the first MSISDN number;
determine that the operating status associated with the first eSIM profile is inactive based on the first MSISDN number received by the server, wherein the server is configured to include the plurality of eSIM profiles and provide an operating status associated with each of the plurality of eSIM profiles; and
transmit, to the MNO, a second MSISDN number associated with a second eSIM profile among the plurality of eSIM profiles whose operating status is active based on determining that the operating status associated with the first eSIM profile is inactive,
wherein the processor is further configured to cause the server to update the operating status of the first eSIM profile in the server from an inactive status to an active status based on determining that the first eSIM profile in the second electronic device is activated.

11. The server of claim 10, wherein the MNO is configured to route the call from the first electronic device to the second eSIM profile based on receiving the second MSISDN number with the active status.

12. The server of claim 10, wherein the processor is further configured to cause the server to transmit the second MSISDN number is based on:
fetching an embedded Universal Integrated Circuit Card (eUICC) ID associated with the plurality of eSIM profiles using the first MSISDN number as a key; and
fetching the second MSISDN number whose operating status is active associated with the second eSIM profile by using the eUICC ID as a key.

13. The server of claim 10, wherein the processor is further configured to cause the server to:
receive an eSIM profile from the second electronic device, wherein the eSIM profile corresponds to a MSISDN number;
associate the eSIM profile with the MSISDN number by using an eUICC key associated with the eSIM profile; and
register the MSISDN number at the server through an OTP authentication mechanism.

14. The server of claim 13, wherein the processor is further configured to cause the server to:
after an eSIM profile associated with the MNO is downloaded at the second electronic device, identify that the eSIM profile associated with the second electronic device is activated; and
create a table for the eSIM profile to store the MSISDN number associated with the eSIM profile.

15. The server of claim 14, wherein the processor is further configured to cause the server to:
generate an One Time Password (OTP) based on receiving the MSISDN number;
transmit the OTP to the second electronic device comprising the eSIM profile with the MSISDN number;
receive the OTP from the second electronic device through the MSISDN number and validating the OTP; and
marking the MSISDN number as active in the table associated with the eSIM profile.

16. The server of claim 15, wherein the processor is further configured to cause the server to update the table based on marking the MSISDN number as active in the table associated with the eSIM profile.

17. The server of claim 15, wherein the processor is further configured to cause the server to:
identify subscription information associated with the second electronic device, and
identify, based on the subscription information, whether each of the plurality of eSIM profiles is related to a national MSISDN number.

18. The server of claim 10, wherein one of the plurality of eSIM profiles is activated, and
wherein remaining eSIM profiles of the plurality of eSIM profiles are inactivated.

* * * * *